US007453060B2

(12) United States Patent
Miller et al.

(10) Patent No.: US 7,453,060 B2
(45) Date of Patent: Nov. 18, 2008

(54) SOLID-STATE FLOW GENERATOR AND RELATED SYSTEMS, APPLICATIONS, AND METHODS

(75) Inventors: Raanan A. Miller, Chestnut Hill, MA (US); John A. Wright, Billerica, MA (US)

(73) Assignee: Sionex Corporation, Bedford, MA (US)

( * ) Notice: Subject to any disclaimer, the term of this patent is extended or adjusted under 35 U.S.C. 154(b) by 23 days.

(21) Appl. No.: 11/787,743

(22) Filed: Apr. 17, 2007

(65) Prior Publication Data

US 2007/0187590 A1 Aug. 16, 2007

Related U.S. Application Data

(63) Continuation of application No. 10/943,523, filed on Sep. 17, 2004, now Pat. No. 7,223,970.

(60) Provisional application No. 60/610,085, filed on Sep. 14, 2004, provisional application No. 60/503,929, filed on Sep. 18, 2003, provisional application No. 60/503,913, filed on Sep. 17, 2003.

(51) Int. Cl.
*B01D 59/44* (2006.01)
*H01J 49/00* (2006.01)

(52) U.S. Cl. ...................................... 250/288; 250/287

(58) Field of Classification Search ................. 250/287, 250/288, 290, 291, 281, 282, 294
See application file for complete search history.

(56) References Cited

U.S. PATENT DOCUMENTS

| | | | |
|---|---|---|---|
| 2,615,135 | A | 10/1952 | Glenn |
| 2,919,348 | A | 12/1959 | Bierman |
| 3,931,589 | A | 1/1976 | Aisenberg et al. |
| 4,023,398 | A | 5/1977 | French et al. |
| 4,025,818 | A | 5/1977 | Giguere et al. |
| 4,070,163 | A | 1/1978 | Kolb et al. |
| 4,201,921 | A | 5/1980 | McCorkle |
| 5,420,424 | A | 5/1995 | Carnahan et al. |
| 5,455,417 | A | 10/1995 | Sacristan |
| 5,536,939 | A | 7/1996 | Freidhoff et al. |
| 5,654,544 | A | 8/1997 | Dresch |
| 5,723,861 | A | 3/1998 | Carnahan et al. |

(Continued)

FOREIGN PATENT DOCUMENTS

SU 966583 A 10/1982

(Continued)

OTHER PUBLICATIONS

"A Micromachined Field Driven Radio Frequency-Ion Mobility Spectrometer for Trace Level Chemical Detection," A Draper Laboratroy Proposal Against the "Advanced Cross-Enterprise Technology Development for NASA Missions," Soliciation, NASA NRA 99-OSS-05.

(Continued)

*Primary Examiner*—Jack I. Berman
*Assistant Examiner*—Meenakshi S Sahu
(74) *Attorney, Agent, or Firm*—Ropes & Gray LLP

(57) ABSTRACT

The invention, in various embodiments, is directed to an analyzer using a solid-state flow generator to provide effluent flow along a flow path and deliver a sample to an ion mobility based filter and detector for analysis.

18 Claims, 12 Drawing Sheets

U.S. PATENT DOCUMENTS

| | | | | |
|---|---|---|---|---|
| 5,763,876 | A | 6/1998 | Pertinarides et al. | |
| 5,789,745 | A | 8/1998 | Martin et al. | |
| 5,801,379 | A | 9/1998 | Kouznetsov | |
| 5,834,771 | A | 11/1998 | Yoon et al. | |
| 5,838,003 | A | 11/1998 | Bertsch et al. | |
| 5,965,882 | A | 10/1999 | Megerle et al. | |
| 6,066,848 | A | 5/2000 | Kassel et al. | |
| 6,124,592 | A | 9/2000 | Spangler | |
| 6,323,482 | B1 | 11/2001 | Clemmer et al. | |
| 6,494,934 | B2 | 12/2002 | Fukushima | |
| 6,495,823 | B1 | 12/2002 | Miller et al. | |
| 6,504,149 | B2 | 1/2003 | Guevremont et al. | |
| 6,512,224 | B1 | 1/2003 | Miller et al. | |
| 6,621,077 | B1 | 9/2003 | Guevremont et al. | |
| 6,639,212 | B1 | 10/2003 | Guevremont | |
| 6,653,627 | B2 | 11/2003 | Guevremont | |
| 6,690,004 | B2 | 2/2004 | Miller et al. | |
| 6,703,609 | B2 | 3/2004 | Guevremont | |
| 6,713,758 | B2 | 3/2004 | Guevremont | |
| 6,753,522 | B2 | 6/2004 | Guevremont | |
| 6,770,875 | B1 | 8/2004 | Guevremont | |
| 6,774,360 | B2 | 8/2004 | Guevremont | |
| 6,787,765 | B2 | 9/2004 | Guevremont | |
| 6,799,355 | B2 | 10/2004 | Guevremont | |
| 6,806,466 | B2 | 10/2004 | Guevremont | |
| 7,223,970 | B2 * | 5/2007 | Miller et al. | 250/291 |
| 2001/0030285 | A1 | 10/2001 | Miller | |
| 2002/0070338 | A1 | 6/2002 | Loboda | |
| 2002/0134932 | A1 | 9/2002 | Guevremont et al. | |
| 2003/0020012 | A1 | 1/2003 | Guevremont | |
| 2003/0038235 | A1 | 2/2003 | Guevremont et al. | |
| 2003/0052263 | A1 | 3/2003 | Kaufman et al. | |
| 2003/0089847 | A1 | 5/2003 | Guevremont et al. | |
| 2003/0132380 | A1 | 7/2003 | Miller et al. | |
| 2004/0007000 | A1 | 1/2004 | Takeda et al. | |
| 2004/0094704 | A1 | 5/2004 | Miller et al. | |
| 2005/0051719 | A1 | 3/2005 | Miller et al. | |

FOREIGN PATENT DOCUMENTS

| | | | |
|---|---|---|---|
| SU | 1337934 | A2 | 9/1987 |
| SU | 1627984 | A2 | 2/1991 |
| SU | 1412447 | A1 | 6/1998 |
| SU | 1485808 | A1 | 6/1998 |
| WO | WO-00/08454 | | 2/2000 |
| WO | WO-00/08455 | | 2/2000 |
| WO | WO-00/08456 | | 2/2000 |
| WO | WO-00/08457 | | 2/2000 |
| WO | WO-01/08197 | A1 | 2/2001 |
| WO | WO-01/22049 | A2 | 3/2001 |
| WO | WO-01/35441 | A1 | 5/2001 |
| WO | WO-01/69217 | A2 | 9/2001 |
| WO | WO-01/69220 | A2 | 9/2001 |
| WO | WO-01/69647 | A2 | 9/2001 |
| WO | WO-02/071053 | A2 | 9/2002 |
| WO | WO-02/083276 | | 10/2002 |
| WO | WO-03/005016 | | 1/2003 |
| WO | WO-2003/015120 | | 2/2003 |

OTHER PUBLICATIONS

Barnett et al., "Isotope Separation Using High-Field Asymmetric Waveform Ion Mobility Spectrometry,"0 Nuclear Instruments & Methods in Physics Reseach, vol. 450, No. 1, pp. 179-185 (2000).

Buryakov et al., "A New Method of Separation of Multi-Atomic Ions by Mobility at Atmospheric Pressure Using a High-Frequency Amplitude-Asymmetric Strong Electric Field," International Journal of Mass Spectrometry and Ion Processes, vol. 128, pp. 143-148 (1993).

Buryakov et al., "Separation of Ions According to Mobility in a Strong AC Electric Field," Letters to Journal of Technical Physics, vol. 17, pp. 11-12 (1991).

Burykov et al., "Device and Method for Gas Electrophoresis, Chemical Analysis of Environment," ed. Prof. V.V. Malakhov, Novosibirsk: Nauka, pp. 113-127 (1991).

Carnahan et al., "Field Ion Spectrometry—A New Analytical Technology for Trace Gas Analysis," ISA, vol. 51, No. 1, pp. 87-96 (1996).

Carnahan et al., "Field Ion Spectometry—A New Technology for Cocaine and Herion Detection," SPIE, vol. 2937, pp. 106-119 (1997).

Eiceman et al., "Miniature radio-frequency mobility analyzer as a gas chromatogrphic detector for oxygen-containing volatile organic compounds, pheromones and other insect attractants," Journal of Chromatography, vol. 917, pp. 205-217 (2001).

Guevremont et al., "Atmospheric Pressure Ion Focusing in a High-Field Asymmetric Waveform Ion Mobility Spectrometer," Review of Scientific Instruments, vol. 70, No. 2, pp. 1370-1383 (1999).

Guevremont et al., "Calculation of Ion Mobilites from Electrospray Ionization High-Field Asymmetric Waveform Ion Mobility Spectrometry Mass Spectrometry," Journal of Chemical Physics, vol. 114, No. 23, pp. 10270-10277 (2001).

Guevremont et al., "High Field Asymmetric Waveform Ion Mobility Spectrometry-Mass Spectrometry: An Investigation of Leucine Enkephalin Ions Produced by Electrospray Ionization," J. Am. Soc. Mass. Spectrom., vol. 10, pp. 492-501 (1999).

Handy et al., "Determination of Nanomolar Levels of Perchlorate in Water by ESI-FAIMS-MS." J. Anal. At. Spectrometry, vol. 15, pp. 907-911 (2000).

Krylov, "A Method of Reducing Diffusion Losses in a Drift Spectrometer," Technical Physics, vol. 4d, No. 1, pp. 113-116 (1999).

Krylov, "Comparison of the Planar and Coaxial Field Asymmetrical Waveform Ion Mobility Spectrometer (FAIMS)," International Journal of Mass Spectrometry, vol. 225, No. 1, pp. 39-51, (2003).

Krylov, "Pulses of Special Shapes Formed on a Capacitive Load," Instruments and Experimental Techniques, vol. 40, No. 5, (1997???). Also cited in Database Nauka/Interperiodika 'Online!, International Acadmic Publishing Company (IAPC), Russia, E. Krylov.

Miller et al., "A MEMS Radio-Frequency Ion Mobility Spectrometer for Chemcial Agent Detection," Proceedings of the 2000 SolidState Sensors and Actuators Workshop (Hilton Head, SC, Jun. 2000).

Miller et al., "A MEMS radio-frequency ion mobility spectrometer for chemical vapor detection," Sensors and Actuators, vol. 91, pp. 301-312 (2001).

Miller et al., "A Novel Micromachined High-Field Asymmetric Waveform-Ion Mobility Spectrometer," Sensors and Actuators B, vol. B67, No. 3, pp. 300-306 (2000).

Pilzecker et al., "On-Site Investigations of Gas Insulated Substrates Using Ion Mobility Spectrometry for Remote Sensing of SF-6 Decomposition," IEEE, pp. 400-403 (2000).

Riegner et al., "Qualitative Evaluation of Field Ion Spectrometry for Chemical Warfare Agent Detection," Proceedings of the ASMS Conference on Mass Spectrometry and Allied Topics, pp. 473A-473B (1997).

Schneider et al., "High Sensitivity GC-FIS for Simultaneous Detection of Chemical Warfare Agents," Journal of Process Analytical Chemistry, vol. 5, Nos. 3, 4, pp. 124-136 (2000).

* cited by examiner

SOLID-STATE FLOW GENERATOR AND RELATED SYSTEMS, APPLICATIONS, AND METHODS

REFERENCE TO RELATED APPLICATIONS

This application is a continuation of U.S. patent application Ser. No. 10/943,523, filed on Sep. 17, 2004, which claims the benefit of: U.S. Provisional Application No. 60/503,929, filed on Sep. 18, 2003, entitled "Compact DMS System"; U.S. Provisional Application No. 60/503,913, filed on Sep. 17, 2003, entitled "Solid-State Gas Flow Generator"; and U.S. Provisional Application No. 60/610,085, filed on Sep. 14, 2004, entitled "Solid-State Flow Generator and Related Systems, Applications, and Methods." The entire teachings of the above referenced applications are incorporated herein by reference.

FIELD OF THE INVENTION

The invention relates to flow generation, and more particularly, in various embodiments, to solid-state flow generators and related systems, methods, and applications.

BACKGROUND

Flowing gases, liquids, and/or vapors (collectively "fluids") and thus, the systems that cause them to flow ("flow systems") are employed in a plethora of applications. By way of example, without limitation, conventionally, flow systems are employed in cooling, heating, circulation, propulsion, mixing, filtration, collection, detection, measurement, and analysis systems. Conventionally, mechanical flow systems employ devices such as pumps, fans, propellers, impellers, turbines, and releasable pressurized fluids to generate fluid flow.

In specific exemplary applications, automobiles, aircraft and watercraft all employ such mechanical flow devices for both cooling and fuel circulation; sewage systems and processing facilities and swimming pools both employ mechanical flow devices for filtration; power plants employ mechanical flow devices for both cooling and power generation; environmental management systems employ mechanical flow devices for heating, cooling and air filtration (e.g., for buildings, automobiles, and aircraft); computers and other electrical/electronic devices employ mechanical flow devices for cooling components; and refrigeration systems employ mechanical flow devices for circulating coolant.

Additionally, mechanical flow devices, such as pumps and releasable pressurized fluids, are conventionally employed to facilitate fluid flow in sample collection, filtration, detection, measurement and analysis (collectively "analysis") systems based, for example, on ion mobility spectrometry (IMS), time of flight (TOF) IMS, differential ion mobility spectrometry (DMS), field asymmetric ion mobility spectrometry (FAIMS), gas chromatography (GC), Fourier transform infrared (FTIR) spectroscopy, mass spectrometry (MS), liquid chromatography mass spectrometry (LCMS), and surface acoustic wave (SAW) sensors.

Mechanical flow devices such as mechanical pumps, impellers, propellers, turbines, fans, releasable pressurized fluids, and the like suffer from significant limitations. By way of example, they are typically large with regard to both size and weight, costly, require regular maintenance to repair or replace worn mechanical components, and consume significant amounts of power. These limitations render conventional mechanical flow devices unsuitable for many applications. Accordingly, there is a need for improved flow systems and devices.

SUMMARY OF THE INVENTION

The invention, in various embodiments, addresses the deficiencies of conventional flow generation systems and devices by providing a solid-state flow generator and related applications, systems and methods. According to one feature, the flow generator of the invention is generally smaller in size and weighs less than its mechanical counterparts. According to another advantage, due to the lack of moving parts, the solid-state flow generator of the invention is also more reliable, requires less maintenance, and consumes less power than its mechanical counterparts.

In one aspect, the invention provides a flow generator including a constrained channel, an ion source in fluid communication with the constrained channel, and an ion attractor in fluid communication with the ion source. The ion attractor attracts ions from the ion source to create a fluid flow in the constrained channel. As described below, the ion source and the ion generator may be variously positioned with respect to each other and the constrained channel. In such configurations, the invention not only enables fluid to flow between the first and second ends of the constrained channel, but also enables fluid to flow into the constrained channel at one end, through constrained channel, and out the constrained channel at the other end. Additionally, the direction of fluid flow may be reversed by reversing the positions of the ion source and the ion attractor relative to the first and second ends of the constrained channel.

According to other embodiments, the solid-state flow generator of the invention can direct the flow toward a particular target. Such targets may include any desired flow destination such as, without limitation, sensors, detectors, analyzers, mixers, the ion attractor itself, and/or a component or location to be heated or cooled.

In one particular configuration, the ion source is located outside the constrained channel proximal to a first end of the constrained channel and the ion attractor is located outside the constrained channel proximal to a second end of the constrained channel. In operation, the attractor attracts ions from the ion source proximal to the first end of the constrained channel toward the second end of the constrained channel. The ion movement displaces molecules and/or atoms in the channel to create a fluid flow from the first end of the channel toward the second end of the constrained channel.

In an alternative configuration, the ion source is located outside the constrained channel proximal to the first end and the ion attractor is located in the constrained channel intermediate to the first and second ends. In a similar fashion to the above described embodiment, the ion attractor attracts the ions from the ion source toward the attractor, creating a fluid flow in the direction from the first end toward the second end of the constrained channel. According to a feature of this configuration, the attractor is configured and positioned such that the fluid flows past and/or through it and through the second end of the constrained channel.

According to another alternative configuration, the ion source is located in the constrained channel intermediate to the first and second ends, and the ion attractor is located outside the constrained channel proximal to second end. Once again, the ion attractor attracts the ions from the ion source toward the attractor, creating a fluid flow in the direction from the first end toward the second end of the constrained channel. According to a feature of this configuration, the ion source is configured and positioned such that the fluid flows past and/or through it and through the second end of the constrained channel.

In a further configuration, the ion source is located in the constrained channel intermediate to the first and second ends, and the ion attractor is located in the channel intermediate to the ion source and the second end. As in the above described embodiments, the ion attractor attracts the ions from the ion source to create a fluid flow in the direction from the first end toward the second end of the constrained channel. According to a feature of this configuration, both the ion source and the attractor are configured and positioned to allow fluid to flow past and/or through them from the from the first end and through the second end of the constrained channel.

In other configurations, the ion source and ion attractor may both be located outside and near the same end of the constrained channel, to effectively either push or pull the flow through the channel, depending on whether the ion source and ion attractor are located near the first end or the second end of the constrained channel.

According to one embodiment, the fluid includes a gas and the ions flowing between the ion source and the ion generator displace molecules and/or atoms in the gas to cause the fluid to flow in the direction of the ions. In another embodiment, the fluid includes a vapor, and the flowing ions displace molecules and/or atoms in the vapor to cause the vapor to flow in the direction of the ions. In a further embodiment, the fluid includes a liquid, and the flowing ions displace molecules and/or atoms in the liquid to cause the liquid to flow in the direction of the ions.

In various embodiments, the constrained channel may be constrained on all lateral sides, for example, as in the case of a tube, pipe or ducting configuration of the constrained channel. However, in other embodiments, the side(s) of the constrained channel may includes gaps and/or apertures extending axially and/or transversely. The sides of the constrained channels may also include inlets and/or outlets for introducing or removing fluid to or from, respectively, the constrained channel. Preferably, the first and second ends of the constrained channel are open. However, in some embodiments, one or both of the ends may be closed/constrained. According to one feature, the constrained channel may have any suitable cross-sectional shape.

According to one application, the invention provides an effluent transport system including a solid-state flow generator. The solid-state flow generator includes an ion source, an ion attractor and a constrained channel. The ion source and ion attractor are positioned relative to each other and the constrained channel to cause an effluent to flow from an effluent source, through the constrained channel to an effluent destination.

According to another application, the invention provides a cooling system including a solid-state flow generator. The solid-state flow generator includes an ion source, an ion attractor and a constrained channel. The solid-state flow generator is located to create a fluid flow from a source of a cooling fluid (e.g., air, water, or other suitable coolant) to a destination requiring cooling. For example, in one configuration, the cooling system of the invention provides a cooling fluid flow to electronic components, including, without limitation, transformers, power circuitry related to generation of an electric field, processors, sensors, filters and detectors. Whereas, in other applications, the cooling system of the invention provides environmental cooling, for example, for a building, automobile, aircraft or watercraft.

In a related application, the invention provides a heating system, including a solid-state flow generator, for flowing a suitable heated effluent from a heated source to a destination requiring heating. Such destinations include, for example, swimming pools, buildings, automobiles, aircraft, watercraft, sensors, filters and detectors.

According to a further application, the invention provides a propulsion system having a solid-state flow generator including an ion source, an ion attractor and constrained flow channel. In one configuration, the ion source and ion attractor are positioned to create a flow that takes in a fluid at a first end of the constrained flow channel and expels it out a second end of the constrained flow channel, with a force sufficient to propel a vehicle. According to one embodiment, the vehicle containing the propulsion system is configured to allow the flow generator to expel the fluid out of the vehicle in a direction opposite to the direction of fluid flow.

In another application, the invention provides a sample analyzer including a solid-state flow generator in fluid communication with a constrained flow channel for creating a flow in a constrained channel to facilitate analysis of the sample. The sample analyzer may include, for example, any one or a combination of a DMS, FAIMS, IMS, MS, TOFIMS, GC, LCMS, FTIR, or SAW detector.

In some configurations, a solid-state flow generator according to the invention causes a sample fluid to flow in an analyzer. According to further configurations, the flow path of the sample fluid includes the constrained channel of the solid-state flow generator. In other configurations, a solid-state flow generator according to the invention causes dopants, such as, methylene bromide ($CH_2Br_2$), methylene chloride ($CH_2Cl_2$), chloroform ($CHCl_3$), water ($H_2O$), methanol ($CH_3OH$), and isopropanol, to be introduced, mixed and/or flowed with the sample. According to some embodiments, the dopants attach to the sample molecules to enhance the analysis sensitivity and discrimination. In other configurations, a sold state flow generator according to the invention causes a purified dry air to be circulated through the sample flow path to reduce humidity-related effects.

According to one particular configuration, a solid-state flow generator according to the invention is employed in a sample analyzer to flow heat from heat generating components, such as power components related to field generation, to other components, such as filter or detector electrodes.

According to another configuration, the solid-state flow generator of the invention, due to its reduced size, may enable and be incorporated into a handheld sized sample analyzer.

Other applications, features, benefits, and related systems and methods of the invention are described below.

BRIEF DESCRIPTION OF THE DRAWINGS

The invention will be more fully understood with reference to the following illustrative description in conjunction with the attached drawings in which like reference designations refer to like elements and in which components may not be drawn to scale.

DESCRIPTION OF ILLUSTRATIVE EMBODIMENTS

Figure 1:
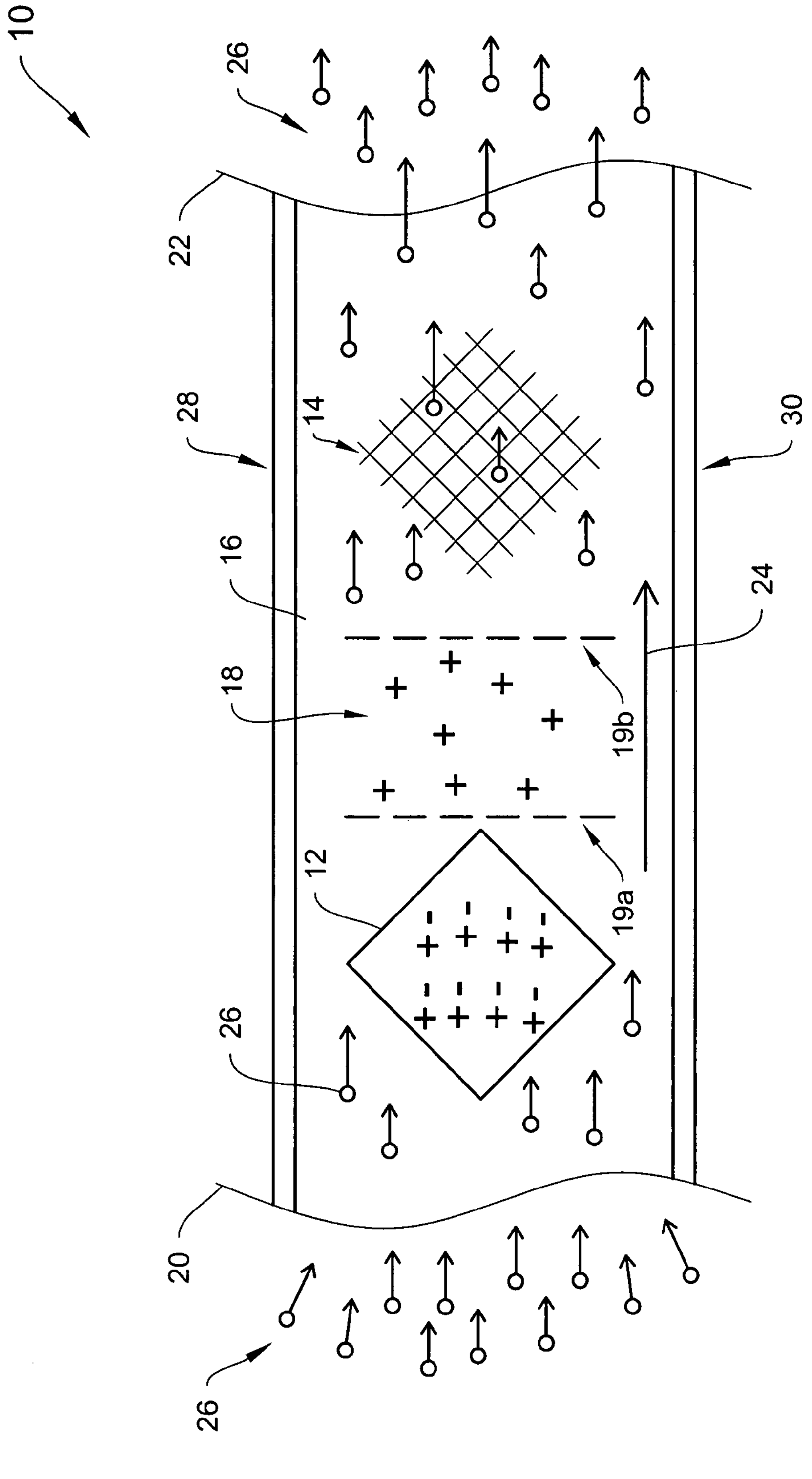
FIG. 1 is a conceptual diagram of a solid-state flow generator according to an illustrative embodiment of the invention.

FIG. 1 shows a conceptual block diagram of ion flow generator 10 according to an illustrative embodiment of the invention. As shown, the ion flow generator 10 includes an ion source 12, an ion attractor 14, and a constrained channel 16.

According to the illustrative embodiment, the ion source 12 may include a radioactive (e.g., $Ni^{63}$), non-radioactive, plasma-generating, corona discharge, ultra-violet lamp, laser, or any other suitable source for generating ions. Additionally, the ion source 12 may include, for example, a filament, needle, foil, or the like for enhancing ion generation.

The ion attractor 14 can be configured, for example, as one or more ion attraction electrodes biased to attract positive or negative ions from the ion source 12. In various illustrative embodiments, the ion attractor 14 may include an array of electrodes. In the illustrative embodiment of FIG. 1, the ion attractor 14 is configured as an electrode grid/mesh biased to attract positive ions 18 from the source 12.

The constrained channel 16 may be any suitable channel where fluid flow is desired, including, for example, a flow channel in a sample analyzer system, such as any of those disclosed herein. It may also be any suitable ducting, tubing, or piping used, for example, in any of the applications disclosed herein. The constrained channel 16 may be have any cross-sectional shape, such as, without limitation, any ovular, circular, polygonal, square or rectangular shape.

The constrained channel 16 may also have any suitable dimensions depending on the application. By way of example, in some illustrative embodiments, the constrained channel 16 has a width of about 10 mm and height of about 2 mm; a width of about 3 mm and height of about 0.5 mm; a width of about 1 mm and height of about 0.5 mm; or a width of about 0.1 mm and height of about 0.5 mm. In other illustrative embodiments, the constrained channel 16 may have a length of between about 10 mm and about 50 mm.

In the illustrative embodiment of FIG. 1, the constrained channel 16 is conceptually shown in cross-section, constrained by the side walls 28 and 30. In various configurations, the channel 16 may be substantially constrained on all sides. However, in other embodiments, the constrained channel 16 may have one or both of the first 20 and second 22 ends open. In other embodiments, the channel 16 may include one or more inlets and/or outlets along a constraining wall, such as along the side walls 28 and 30. Such inlets and/or outlets may be employed to introduce one or more additional effluents into the channel 16, or to remove one or more effluents from the channel 16.

In other illustrative embodiments, the channel 16 is not constrained on all sides. By way of example, the channel 16 may have a polygonal cross-sectional shape, with one or more of the polygonal constraining sides removed. Alternatively, the channel 16 may have an ovular cross-sectional shape, with an arced portion of the constraining wall removed along at least a portion of the length of the channel 16.

In some illustrative configurations, the channel 16 is milled into a substrate. However, in other illustrative configurations, the channel 16 is formed from interstitial spaces in an arrangement of discrete components, such as: circuit components on a printed circuit board; electrodes in, for example, a detector, filter or analyzer configuration; or an arrangement of electrical, mechanical, and/or electromechanical components in any system in which the solid-state flow generator is employed.

In operation, the ions 18 traveling from the ion source 12 toward the ion attractor 14 displace fluid molecules and/or atoms in the constrained channel 16. This creates a pressure gradient in the channel 18, such that the pressure is higher near a first end 20 of the channel 16 relative to near a second end 22 of the channel 16. This, in turn, causes a fluid flow in the constrained channel 16 in a direction from the first end 20 of the channel 16 toward the second end 22, as indicated by the arrow 24. The pressure differential causes the flow to draw in fluid molecules and/or atoms 26 (collectively the "effluent") at the first end 22 of the channel 16 and propel them through the channel 16 and out the second end 22. Conceptually, the effluent 26 can be viewed as either being pulled through the channel 16 by the trailing edge 19*a* of the flowing ions 18 or being pushed through the channel 16 by the leading edge 19*b* of the flowing ions 18. More particularly, the displacement of the ions 18 creates voids that are filled by neutral molecules and/or atoms to create the flow.

In one practice of the invention, by rapidly switching/modulating the ion source and/or ion attractor on and off, the ion flow can be rapidly switched between flow, no-flow, and intermediate effluent flow states, with effluent flow rate being directly proportional to the ion flow rate. According to one illustrative embodiment, the solid state flow generator 10 of the invention can generate and control precisely flow rates (e.g., in a DMS system) from about 0 to about 3 l/m. According to other illustrative embodiments, the dimensions of the constrained channel, parameters, number of ion sources and/or ion attractors, efficiency of gas ionization, and/or field strength may be varied to generate and/or control larger flow rates.

As shown, the ion source 12 is configured and positioned to enable the effluent to flow around and in some configurations through it. Similarly, the electrode grid 14 is also configured to allow the effluent to flow through and/or around it. As described above, the effluent 26 may be any gas, liquid, vapor or other fluid.

In the illustrative embodiment of FIG. 1, both the ion source 12 and the ion attractor 14 are depicted as being within the constrained channel 16. However, in an alternative illustrative embodiment, the ion source 12 is located outside of the constrained channel 16 proximal to the first end 20 of the constrained channel 16, and the ion attractor 14 is located outside the constrained channel 16 proximal to the second end 22. As in the illustrative embodiment of FIG. 1, in operation, the attractor 14 attracts the ions 18 from the ion source 12 causing the ions to flow toward the second end 26 of the constrained channel 16, as indicated by the arrow 24. The movement of the ions 18 displaces the effluent 26 in the channel 16 to create a fluid flow from the first end 20 toward the second end 22.

In another alternative configuration, the ion source 12 is located outside the constrained channel 16 proximal to the first end 20, and the ion attractor 14 is located in the constrained channel 16 intermediate to the first 20 and second 22 ends. The ion attractor 14 once again attracts the ions 18 from the ion source 12, creating a fluid flow in the direction of the arrow 24 from the first end 20 toward the second end 22. As in the case of the embodiment of FIG. 1, the attractor 14 is configured and positioned such that the effluent 26 flows past it and through the second end 22 of the constrained channel 16.

In an additional alternative configuration, the ion source12 is located in the constrained channel 16 intermediate to the first 20 and second 22 ends, and the ion attractor 14 is located outside the constrained channel 16 proximal to second end 22. As in the above described embodiments, the ion attractor 14 attracts the ions 18 from the ion source 12, creating a fluid flow in the direction of the arrow 24 from the first end 20 toward the second end 22 of the constrained channel 16. According to a feature of this configuration, the ion source 12 is configured and positioned such that the effluent 26 flows past it and through the second end 22 of the constrained channel 16.

In yet a further alternative configuration, the ion source 12 is located in the constrained channel 16 intermediate to the first 20 and second 22 ends with the first and second ion attractors, respectively, on either side of the ion generator. One or both of the ion attractors may be within the constrained channel 16. Alternatively, both ion attractors may be outside the constrained channel 16. By alternatively activating the first and second attractors, the direction of flow in the constrained channel 16 may be changed/reversed.

In other illustrative embodiments, the direction of flow 24 can be reversed by reversing the location of the ion source 12 and the ion attractor 14 relative to the first 20 and second 22 ends of the constrained channel 16. More particularly, by locating the ion source 12 proximal to the second end 22 and by locating the ion attractor 14 proximal to the first end 20, the direction of fluid flow can be reversed to flow in a direction from the second end 22 toward the first end 20.

According to further illustrative embodiments, the flow generator 10 can direct the flow of the effluent 26 toward a target. The target may be any suitable target and can include, for example, a filter, collector, detector, analyzer, ion attractor, a component or location to be cooled or heated, a location for mixing, and/or any other desired destination for the effluent 26. With continued reference to FIG. 1, the target may be located inside or outside of the constrained channel 16. The target may also be located upstream or downstream of the ion source 12, and upstream or downstream of the ion attractor 14. Additionally, the target may be located intermediate to the ion source 12 and the ion attractor 14. In one illustrative embodiment, the ion attractor 14 is or includes the target.

A source of ions having low energy is less likely to ionize the effluent 26 that it is causing to flow. Thus, ionization of the effluent 26 is a matter of design choice that can be accommodated in various illustrative embodiments of the invention. However, low ionization energy features of the invention may be employed where the ionized effluent is to be directed away from the target, and the effluent 26 is to be drawn into or over the target, without subjecting the ion-sensitive target to ionization.

According to another illustrative embodiment, a plurality of flow generators of the type depicted in FIG. 1 can be arranged in an effluent in a pattern to create any desired flow pattern. In a related configuration, a single constrained channel 16 includes a single ion source 12 and a plurality of ion attractors 14 to create a multidirectional flow pattern. In another related configuration, a single constrained channel includes a plurality of ion generators 12 and a plurality of ion attractors 14 arranged in a pattern to create any desired flow pattern. In one configuration of this embodiment, each ion generator 12 has an associated ion attractor 14. The flow patterns created by the above described examples may be either or any combination of linear, angled, or curved, and may be in 1, 2 or 3 dimensions. The generated flow patterns may also be used to compress suitable fluids.

According to an advantage of the invention, due to its lack of moving parts, the solid-state flow generator of the invention can run substantially silently, is more compact, uses less power, and is more reliable than conventional mechanical flow generators. According to another advantage, it also requires no replacement or repair of worn parts.

Figure 2:
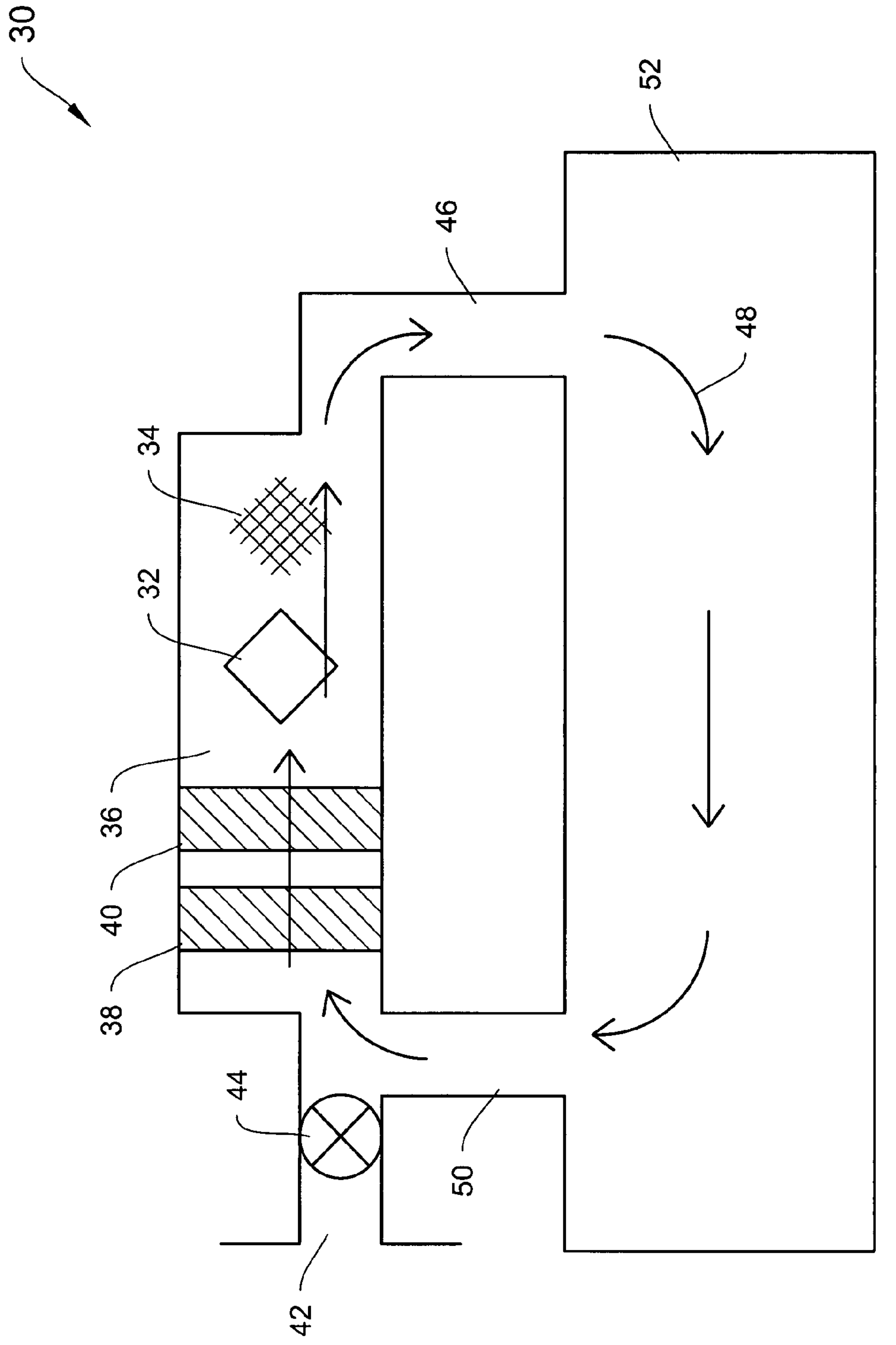
FIG. 2 is a conceptual diagram of a fluid circulation system employing a solid-state flow generator according to an illustrative embodiment of the invention.

FIG. 2 is a conceptual diagram of a fluid circulation system 30 employing a solid-state flow generator according to an illustrative embodiment of the invention. As in the case of the illustrative embodiment of FIG. 1, the solid-state flow generator of FIG. 2 includes an ion source 32, ion attractor 34, and a constrained flow channel 36. As described above with respect to FIG. 1, the ion source 32 provides a source of ions and the ion attractor 34 attracts either positive or negative ions, depending on an applied bias voltage. The ion flow created in the constrained channel 36 by the interaction of the ion source 32 with the ion attractor 34 causes a fluid flow to be created. In the instant example, a fluid is provided by an inlet 42. A check valve 44 enables switching between introducing an external effluent into the circulation system 30 when the check valve 44 is open, and re-circulating internal effluent when the check valve 44 is closed. The circulation system 30 also includes a heating unit 38 and a cooling unit 40.

In operation, the effluent in the illustrated embodiment, e.g., air, enters through the inlet 42, passes through the check valve 44, and is pulled through the constrained channel 36 past the heating 38 and the cooling 40 units, and through the ducting 46 into the space 52. The effluent circulates in a direction 48 to provide, in this case, air flow within the space 52 and eventually through the ducting 50 to the constrained channel 36 to continue the circulation cycle. The ducting 46 and 50 may be, for example, any ducting, tubing, or piping suitable for the needs of a particular fluid circulation system. The space 52 may be, for example, a room within a dwelling, an aircraft compartment, a vehicle compartment, or any open or closed space or area requiring a circulated fluid. To regulate the temperature within space 52, the heating unit 38 and/or the cooling unit 40 may be activated to either heat or cool the effluent as it is circulated through the constrained channel 36. According to further illustrative embodiments, the solid-state flow generator may be located either upstream or downstream of heating unit 38 or the cooling unit 40 within constrained flow channel 36 to facilitate effluent flow in the circulation system 30. Also, additional elements may be placed within that constrained flow channel 36 or within the ducting 46 and 50 to enable, for example, air purification, filtration, sensing, monitoring, measuring and/or other effluent treatment.

Figure 3:
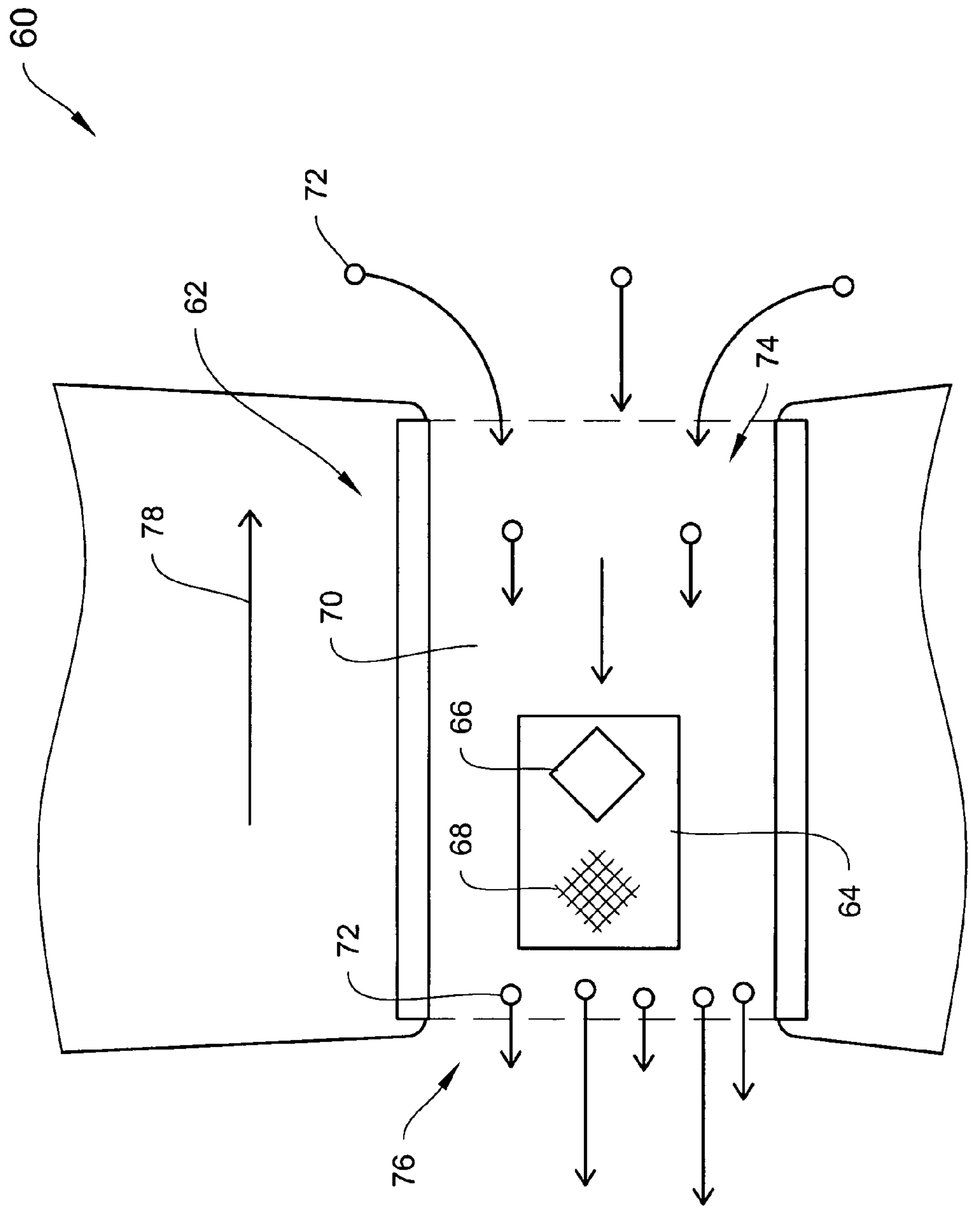
FIG. 3 is a conceptual diagram of a vehicle including a propulsion system employing a solid sate flow generator according to an illustrative embodiment of the invention.

FIG. 3 is a conceptual block diagram of a vehicle 60 including a vehicle propulsion system 62 employing a solid-state flow generator 64 according to an illustrative embodiment of the invention. As in the case of the illustrative embodiment of FIG. 1, the solid-state flow generator 64 includes an ion source 66, ion attractor 68, and a constrained flow channel 70. As described above with respect to FIG. 1, the ion source 66 provides a source of ions and the ion attractor 68 attracts either positive or negative ions, depending on an applied bias voltage. The ion flow created in the constrained channel 70 due to the interaction of the ion source 66 with the ion attractor 68 causes a fluid flow to be created.

In operation, the effluent 72 enters the constrained channel 70 through the inlet 74, passes through the constrained channel 70, and eventually is expelled from the vehicle propulsion system 62 at the outlet 76 with a force sufficient to propel the vehicle 60. In the process of expelling effluent 72, vehicle 60 moves in a direction 78 opposite to the direction of the effluent 72 flow.

According to related illustrative embodiments, the vehicle propulsion system 62 may include multiple flow generators 64 to increase the flow of ions, resulting in an increase in the volume and/or rate of effluent 72 flow, and in increased reactive movement of the vehicle 60 in, for example, the direction 78. Because the ion flow impels (i.e., it pushes, pulls, or otherwise influences movement of,) the effluent 72 into a flowing state, the rate and volume of which is directly related to the rate and volume of the ion flow, the greater the ion flow rate and/or flow volume, the greater the effluent 72 flow rate and/or flow volume.

In another related embodiment, the propulsion system 62 may employ a pair of flow generators 64, with the flow generators of the pair oriented in substantially opposing directions. By alternatively activating one or the other of the flow generators, vehicle motion in two directions may be achieved. In a further embodiment, multiple pairs of flow generators may be employed to achieve vehicle motion in more than two directions, and in two or three dimensions.

Figure 4:
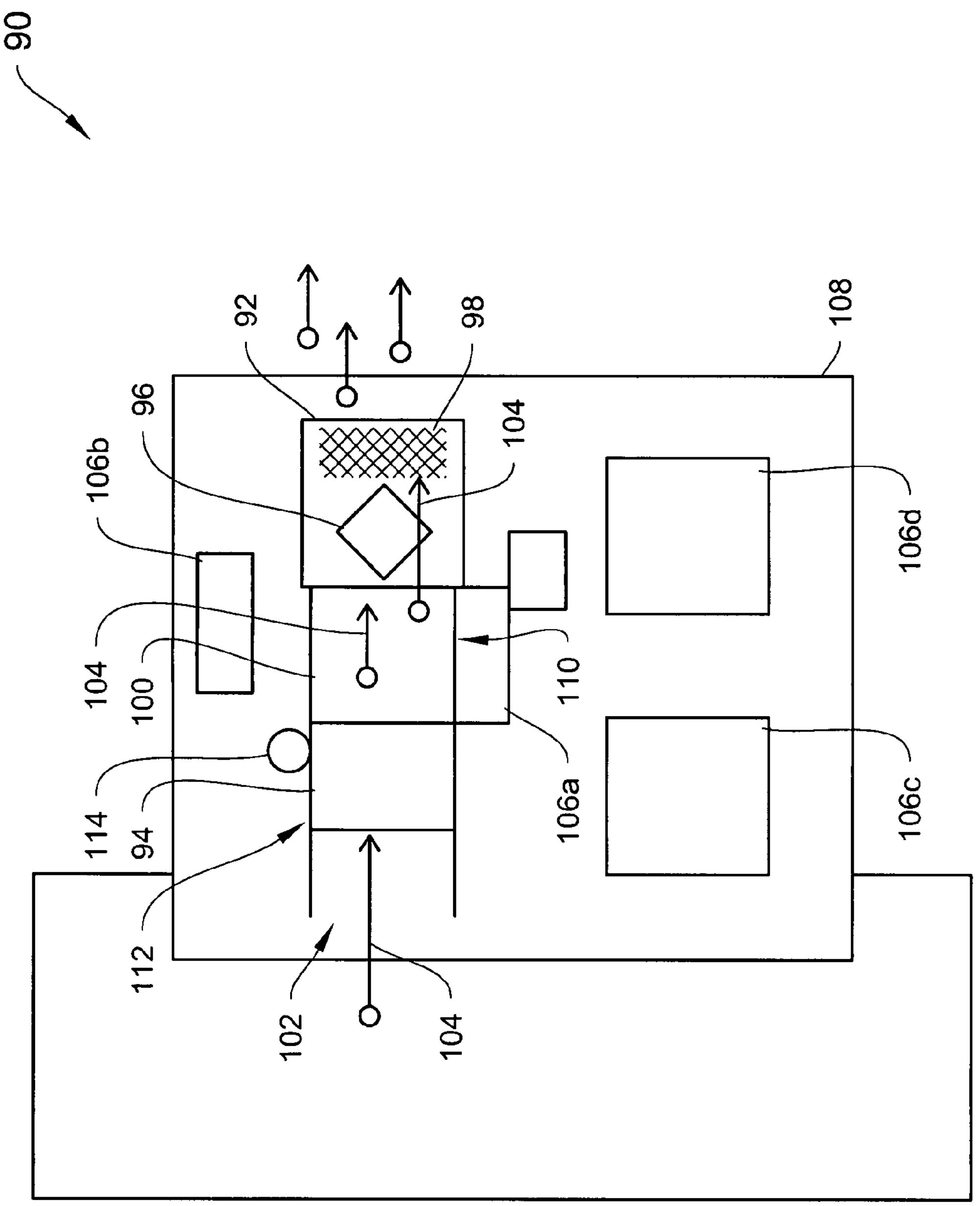
FIG. 4 is a conceptual diagram of circuit configuration employing a solid-state flow generator for circulating an effluent for cooling or heating a target component according to an illustrative embodiment of the invention.

FIG. 4 is a conceptual block diagram of a circuit configuration 90 employing a solid-state flow generator 92 for circulating an effluent for cooling or heating a target component 94 according to an illustrative embodiment of the invention. As in the case of the illustrative embodiment of FIG. 1, the solid-state flow generator 92 includes an ion source 96, an ion attractor 98, and a constrained channel 100. Various circuit components 106*a*-106*d*, such as the target component 94, e.g., a central processing unit (CPU), are mounted on a circuit board 108.

The constrained flow channel 100 may be defined, at least in part, by the spaces between the various circuit elements, including any of the circuit components 106*a*-106*d*. In the illustrative embodiment, one side of the circuit component 106*a* provides a portion of the side wall or boundary 110 for the constrained channel 100. However, in alternative embodiments, any suitable tubing, piping, ducting, milling or the like, individually or in combination, may be employed to constrain the channel 100. The constrained channel 100 also includes inlet 102 and outlet 116 ends. A thermister 114 measures the temperature of the circuit component 94. Measurements from the thermister 114 may be used to turn determine when to turn the flow generator 92 on and off to regulate the temperature of the circuit component 94. In other embodiments, an off-board or remote temperature sensor may be employed.

As described above with respect to FIG. 1, the ion source 96 provides a source of ions and the ion attractor 98 attracts either positive or negative ions, depending on an applied bias voltage. The ion flow created in the constrained channel 100 due to the ion flow generated by the interaction of the ion source 96 with the ion attractor 98 causes a fluid flow to be created.

In operation of the circuit configuration 90, in response to the component 96 reaching or exceeding a specified temperature, as measured by the thermister 114, the flow generator 92 turns on. This, in turn, creates an ion flow and draws the effluent 104, e.g., air, into the constrained channel 100 via the inlet 102. Through convection, the effluent 104 absorbs heat energy generated by the circuit component 94 and transports it through the constrained channel 100 to the outlet end 116 of the channel 100. In response to the thermister 114 detecting that the component 94 has sufficiently cooled, the ion generator 92 shuts off to shut off the ion and effluent 104 flows. Shutting off the ion and effluent flows also conserves power consumption in the circuit configuration 90. Power conservation, for example, may be particularly important in applications where the circuit configuration 90 is employed in a portable, compact, and/or hand-held unit. According to one feature, a solid-state flow generator of the invention may be switched rapidly and substantially instantaneously between on and off states.

In an alternative illustrative embodiment, heat flow from the component 94, rather than be directed out the channel end 116, may be directed to other components whose operation/performance may be improved by heating. For example, such heat flow may be directed to the filter and/or detector electrodes of any of the sample analyzer systems disclosed herein.

As described above, the solid-state flow generator of the invention may be integrated into any of a plurality of sample analyzer systems. By way of example, without limitation, the solid-state flow generator of the invention may be employed with any one or a combination of a DMS, FAIMS, IMS, MS, TOF IMS, GC MS, LC MS, FTIR, or SAW system.

An IMS device detects gas phase ion species based, for example, on time of flight of the ions in a drift tube. In a DMS or FAIMS detector, ions flow in an enclosed gas flow path, from an upstream ion input end toward a downstream detector end of the flow path. Conventionally, a mechanical pump or other mechanical device provides a gas flow. The ions, carried by a carrier gas, flow between filter electrodes of an ion filter formed in the flow path. The filter submits the gas flow in the flow path to a strong transverse filter field. Selected ion species are permitted to pass through the filter field, with other species being neutralized by contact with the filter electrodes.

The ion output of an IMS or DMS can be coupled to a (MS for evaluation of detection results. Alternatively, another detector, such as an electrode-type charge detector, may be incorporated into the DMS device to generate a detection signal for ion species identification.

DMS analyzer systems may provide, for example, chemical warfare agent (CWA) detection, explosive detection, or petrochemical product screenings. Other areas of detection include, without limitation, spore, odor, and biological agent detection.

SAW systems detect changes in the properties of acoustic waves as they travel at ultrasonic frequencies in piezoelectric materials. The transduction mechanism involves interaction of these waves with surface-attached matter. Selectivity of the device is dependent on the selectivity of the surface coatings, which are typically organic polymers.

TOF IMS is another detection technology. The IMS in this system separates and identifies ionic species at atmospheric pressure based on each species' low field mobilities. The atmospheric air sample passes through an ionization region where the constituents of the sample are ionized. The sample ions are then driven by an electric field through a drift tube where they separate based on their mobilities. The amount of time it takes the various ions to travel from a gate at the inlet region of the drift tube to a detector plate defines their mobility and is used to identify the compounds.

MS identifies ions, atoms, and/or molecules based on their charge-to-mass ratio (z/m). A MS is a relatively sensitive, selective, and rapid detection device. Some MS systems are TOF and linear quadrupole devices. An Ion Trap is another type of MS analyzer. Small portable cylindrical ion traps can be used as mass spectrometers for chemical detection in the field.

GC systems are used to detect a variety of CWA agents. Samples are can be pre-concentrated and vapor is injected into the GC column by the inert carrier gas that serves as the mobile phase. After passing through the column, the solutes of interest generate a signal in the detector. Types of GC systems include electron capture, thermionic, flame, low-energy plasma photometry, photo-ionization, and micromachined systems.

Other analytic techniques include molecular imprinting and membrane inlet mass spectrometry. Sorbent trapping in air sampling, solid-phase extraction, and solid phase microextraction are methods for sample pre-concentration.

Figure 5:
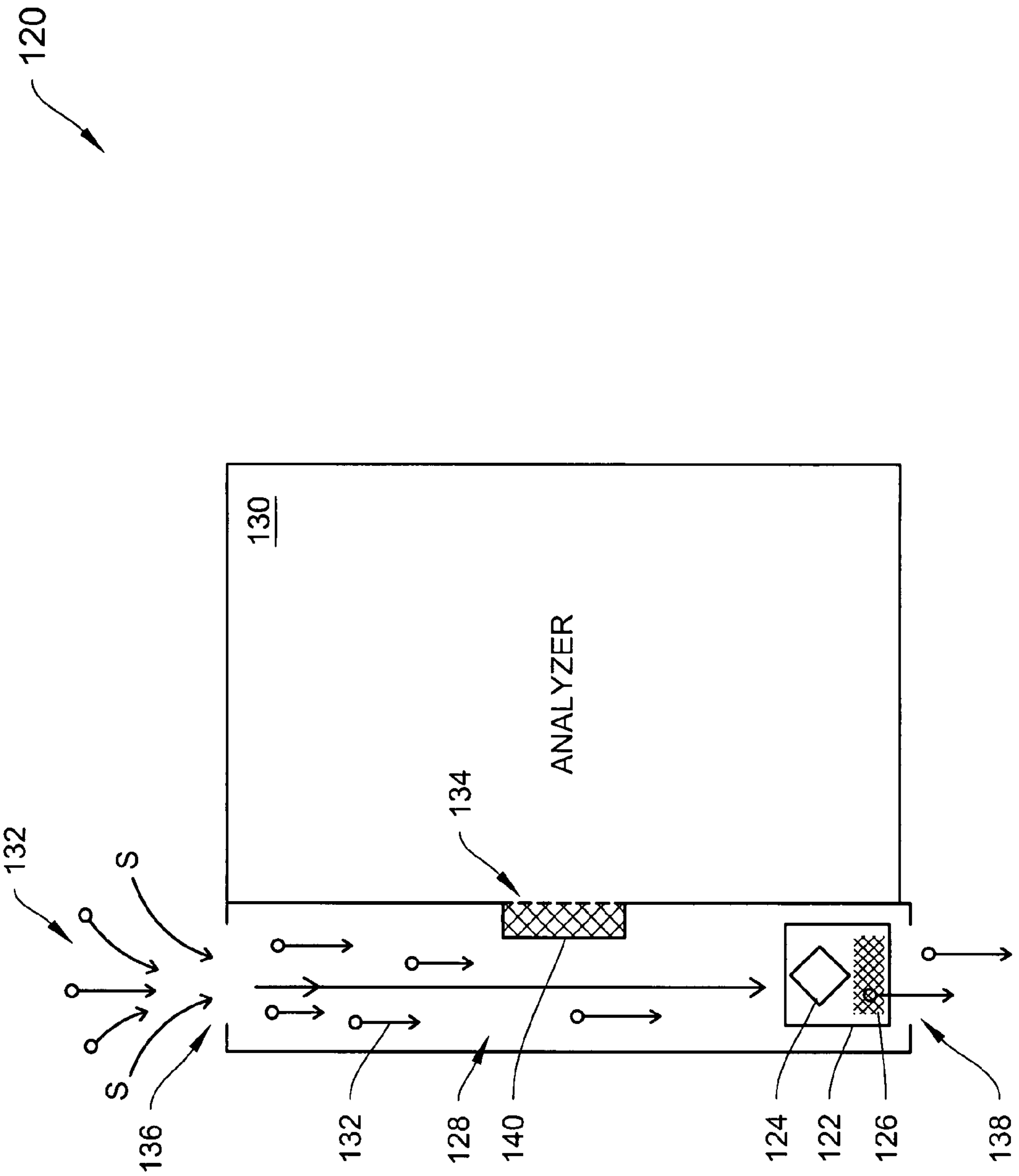
FIG. 5 is a conceptual block diagram of a sample analyzer system employing a solid-state flow generator for flowing a sample fluid according to an illustrative embodiment of the invention.

FIG. 5 is a conceptual block diagram of an analyzer system 120 employing a solid-state flow generator 122 for flowing a sample gas according to an illustrative embodiment of the invention. As in the case of the illustrative embodiment of FIG. 1, the solid-state flow generator 122 includes an ion source 124, ion attractor 126, and a constrained flow channel 128. As described above with respect to FIG. 1, the ion source 124 provides a source of ions and ion attractor 126 attracts either positive or negative ions, depending on an applied bias voltage. The ion flow created in the constrained channel 128 due to the ion flow generated by the interaction of the ion source 124 with the ion attractor 128 creates a fluid, e.g., a sample gas, flow.

The illustrative constrained channel 128 includes inlet end 136 and outlet end 138. The constrained channel 128 also includes a sample introduction inlet 134 for transferring the sample gas or effluent 132 into the analyzer 130 for further analysis. A pre-concentrator 140 may be employed with the analyzer system 120 to provide sample pre-separation and enhance separation of interferents from the sample. In the illustrative embodiment of FIG. 5, the pre-concentrator 140 is depicted as being near the analyzer inlet 134. However, in other embodiments, the pre-concentrator may be positioned in other locations in fluid communication with the analyzer inlet.

In operation, the sample gas effluent 138 enters the constrained channel 128 through the inlet 136, passes through the constrained channel 128, and is eventually expelled from the constrained channel 128 at the outlet end 138. In the process of traveling through channel 128, a portion of effluent 132 is collected by the sample analyzer via the sample introduction inlet 134. The portion of the sample gas effluent 132 may be subjected to filtering by the pre-concentrator 140 to remove possible interferrents before introduction into the analyzer. In some embodiments, the sample analyzer 130 may include a solid-state flow generator internally to draw the effluent sample 122 into the analyzer 130 from the constrained channel 128.

Figure 6:
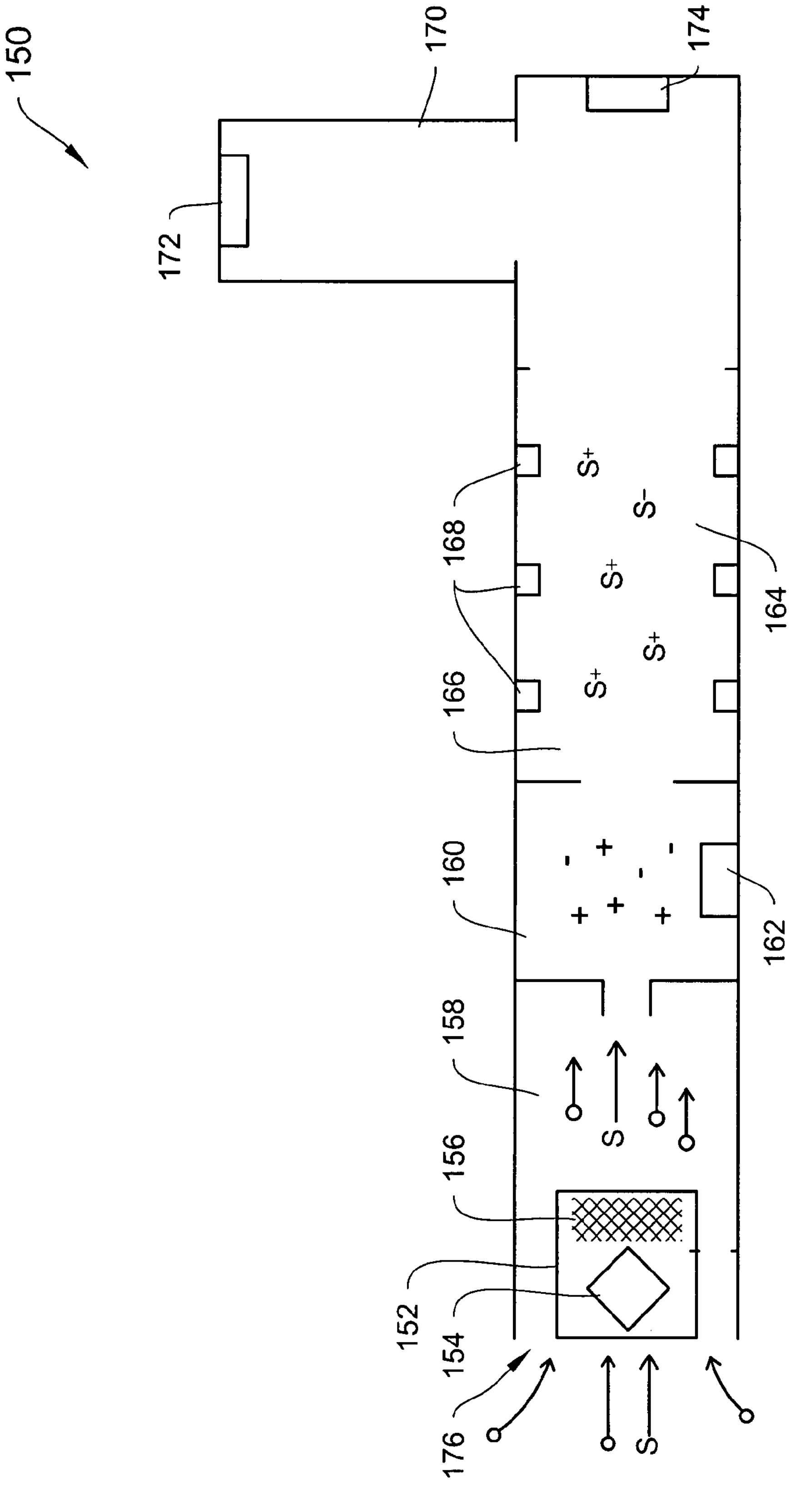
FIG. 6 is a conceptual block diagram of a MS analyzer system employing a solid-state flow generator for flowing a sample fluid according to an illustrative embodiment of the invention.

FIG. 6 is a conceptual block diagram of a TOF MS analyzer system 150 employing a solid-state flow generator 152 for flowing a sample gas according to an illustrative embodiment of the invention. While FIG. 6 depicts a TOF MS, any type of MS system may be employed with the solid-state flow generator 152. As in the case of the illustrative embodiment of FIG. 1, the solid-state flow generator 152 includes an ion source 154, an ion attractor 156, and a constrained flow channel 158. As described above with respect to FIG. 1, the ion source 154 provides a source of ions and ion attractor 156 attracts either positive or negative ions, depending on a bias voltage applied to the ion attractor 156. The ion flow created in the constrained channel 158 due to the ion flow generated by the interaction of the ion source 154 with the ion attractor 156 causes a fluid, e.g., a sample gas, flow to be created. The TOFMS analyzer system 150 employs an ionizer 162 within an ionization region 160 for ionizing the sample gas before analyzing the sample in an analyzer region 164, and then detecting a specified agent within the sample using the detector 166. The analyzer region 166 includes concentric rings 168 for propelling the ionized sample toward the detector 174. In the instant example, a TOF region 170 and TOF detector 172 are further used to identify particular constituents in the sample gas effluent 176.

Figure 7:
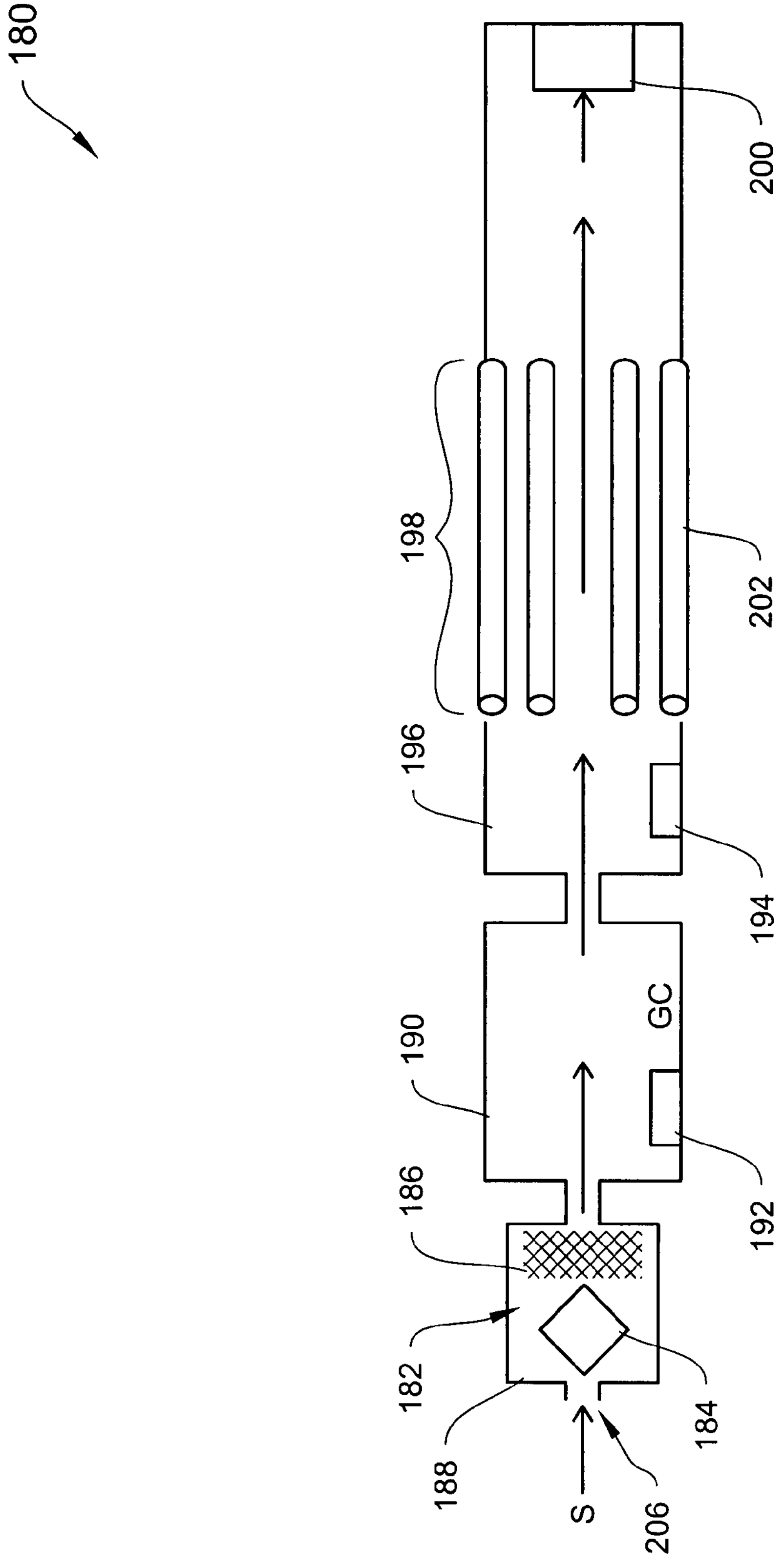
FIG. 7 is a conceptual block diagram of a GC MS analyzer system employing a solid-state flow generator for flowing a sample fluid according to illustrative embodiment of the invention.

FIG. 7 is a conceptual diagram of a GCMS analyzer system 180 employing a solid-state flow generator 182 for flowing a sample gas according to illustrative embodiment of the invention. As in the case of the illustrative embodiment of FIG. 1, the solid-state flow generator 182 includes an ion source 184, an ion attractor 186, and a constrained flow channel 188. As described above with respect to FIG. 1, the ion source 184 provides a source of ions and the ion attractor 186 attracts either positive or negative ions, depending on an applied bias voltage. The ion flow created in the constrained channel 188 due to the ion flow generated by the interaction of the ion source 184 with the ion attractor 186 creates a fluid, e.g., a sample gas, flow. The GCMS analyzer system 180 employs a GC column 190 with a heating unit 192 for providing pre-separation of desired species in the sample gas. An ionizer 194 within an ionization region 196 ionizes the sample gas before analyzing the sample in a quadrupole analyzer region 198 and detecting a particular agent within the sample using the detector 200. The analyzer region 198, illustratively, includes four analyzer poles 202 for propelling the ionized sample toward detector 200.

In operation, a sample gas is drawn into the inlet 206 by a vacuum or pressure drop created at the inlet 206 due to the movement of ion between ion source 184 and the ion attractor 186 in the constrained channel 188. The constrained flow channel, in this instance, may be considered to extend through the GC column 190 and through the ionization region 196 to the detector 200. In this illustrative embodiment, the flow generator 182 is located upstream of the GC column 190, the quadrupole analyzer 198, and the detector 200 to provide sample gas collection. However, in other embodiments, the flow generator 182 may be positioned downstream of the any or all of the GC column 190, the quadrupole analyzer 198, and the detector 200. Upon entry into the GC column 190, the gas sample may be heated by the heater 192 to enable separation of desired species from other species within the gas sample. After separation, a portion of the gas sample passes into the ionization region 196 where the ionizer 194 ionizes the gas. The quadrupole analyzer 198 then propels the ionized gas toward detector 200 to enable detection of species of interest.

Figure 8:
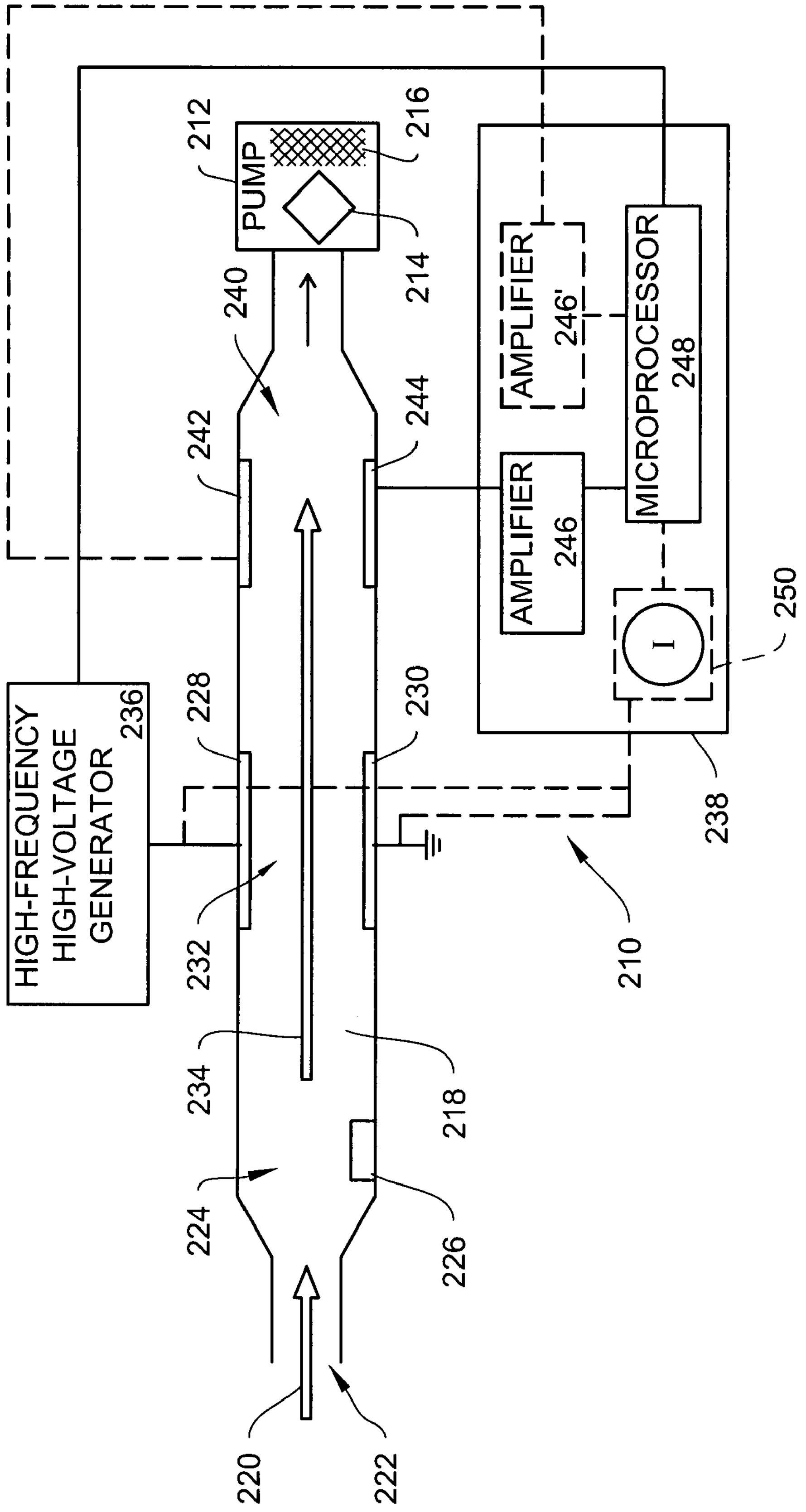
FIG. 8 is a conceptual block diagram of a FAIMS/DMS analyzer system incorporating a solid-state flow generator for flowing a sample fluid according to an illustrative embodiment of the invention.

FIG. 8 is a conceptual block diagram of a FAIMS/DMS analyzer system 210 incorporating a solid-state flow generator 212 for flowing a sample gas according to an illustrative embodiment of the invention. As in the case of the illustrative embodiment of FIG. 1, the solid-state flow generator 212 includes an ion source 214, an ion attractor 216, and a constrained flow channel 218. As described above with respect to FIG. 1, the ion source 214 provides a source of ions and the ion attractor 216 attracts either positive or negative ions, depending on an applied bias voltage. The ion flow created in the constrained channel 218 due to the ion flow generated by the interaction of the ion source 214 with the ion attractor 216 generates a fluid, e.g., a sample gas, flow.

In some illustrative embodiments, the FAIMS/DMS analyzer system 210 operates by drawing gas, indicated by arrow 220, using the flow generator 212, through the inlet 222 into the ionization region 224 where the ionizer 226 ionizes the sample gas. The ionized gas follows the flow path 234 and passes through the ion filter 232 formed from the parallel electrode plates 228 and 230. As the sample gas passes between the plates 228 and 230, it is exposed to an asymmetric oscillating electric field. The voltage generator 236, under the controller 238, applies a voltage to the plates 228 and 230 to induce the asymmetric electric field.

As ions pass through the filter 232, some are neutralized by the plates 228 and 230 while others pass through and are sensed by the detector 240. The detector 240 includes a top electrode 242 at a biased to particular voltage and a bottom electrode 244, at ground potential. The top electrode 242 deflects ions downward to the electrode 244. However, either electrode 242 or 244 may detect ions depending on the ion and the bias voltage applied to the electrodes 242 and 244. Multiple ions may be detected by using the top electrode 242 as one detector and the bottom electrode 244 as a second detector. The controller 238 may include, for example, an amplifier 246 and a microprocessor 248. The amplifier 246 amplifies the output of the detector 240, which is a function of the charge collected, and provides the output to the microprocessor 248 for analysis. Similarly, the amplifier 246', shown in phantom, may be provided in the case where the electrode 242 is also used as a detector.

To maintain accurate and reliable operation of the FAIMS/DMS analyzer system 210, neutralized ions that accumulate on the electrode plates 228 and 230 are purged. This may be accomplished by heating the flow path 234. For example, the controller 238 may include a current source 250, shown in phantom, that provides, under control of the microprocessor 248, a current (I) to the electrode plates 228 and 230 to heat the plates, removing accumulated molecules. Similarly, a solid-state flow generator may be used to direct heated air dissipated from components of the generator 236 and/or controller 238 to the filter 232 to heat the plates 228 and 230. A FAIMS/DMS based analyzer is disclosed in further detail in U.S. Pat. No. 6,495,823, the entire contents of which are incorporated herein by reference.

Figure 9:
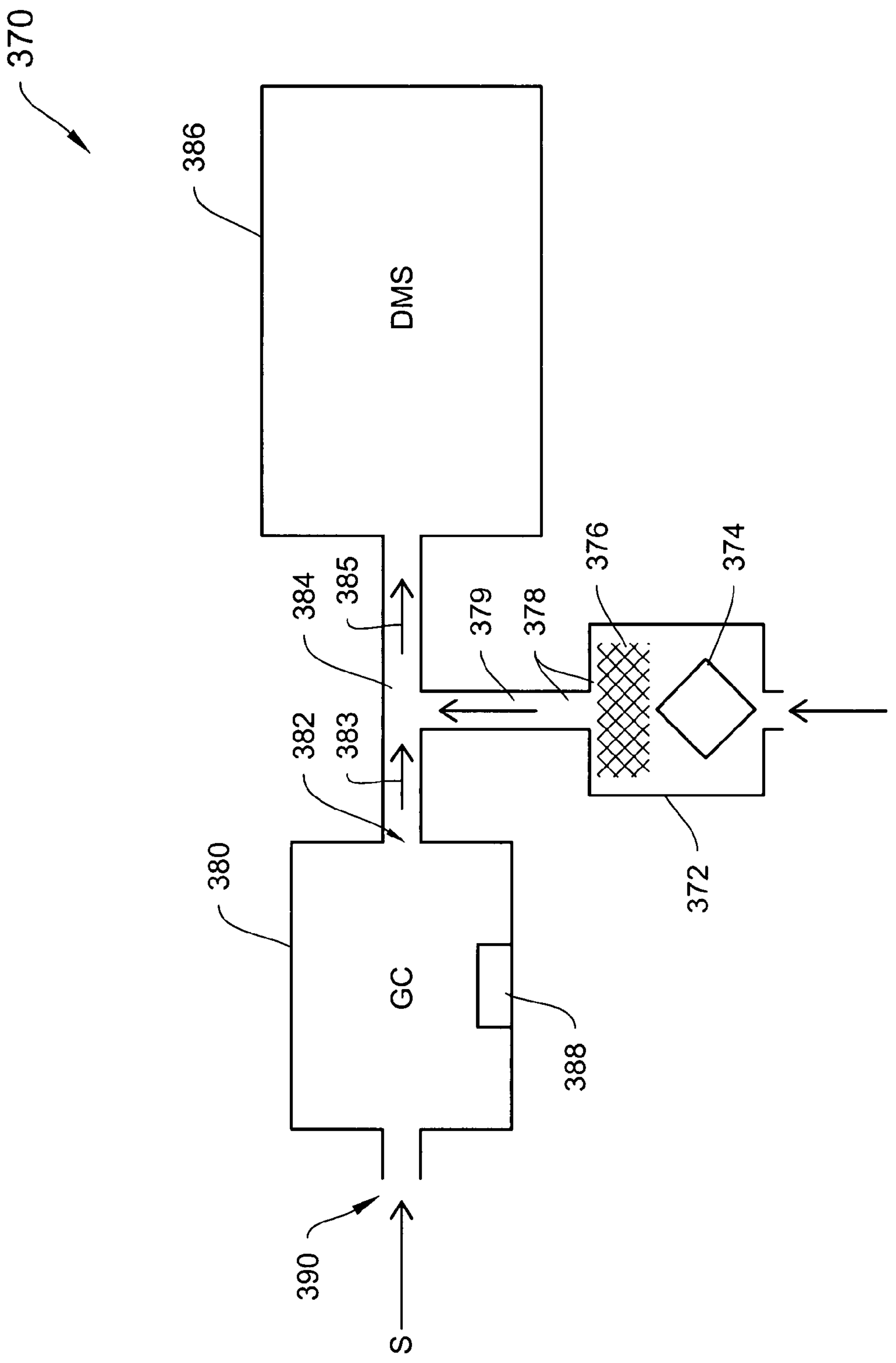
FIG. 9 is a conceptual block diagram of an exemplary GC DMS system employing a solid state flow generator for flowing a sample fluid according to an illustrative embodiment of the invention.

FIG. 9 is a conceptual block diagram of an exemplary GCDMS system 370, including a GC 380 and a DMS 386, and employing a solid state flow generator 372 according to an illustrative embodiment of the invention. The GC 380 includes a heating unit 388 for providing pre-separation of desired species in the sample S. As described with regard to the illustrative embodiment in FIG. 8, the DMS analyzer 386 employs filtering and detection to analyze the sample S delivered from the GC-to-DMS channel 384.

Typically, the flow rate from the GC 380 is about 1 μl/m. However, the DMS 316 typically requires a flow rate of about 300 ml/m. Conventionally, a GC DMS system of the type depicted in FIG. 9 couples a transport gas into the flow path 384 to increase the flow rate into the DMS 386 from the GC 380. Exemplary transport gases, include, without limitation, filtered air or nitrogen, originating for example, from a gas cylinder or a gas pump.

However, according to the illustrative system 370, the solid-state flow generator 372 provides the flow necessary to boost the flow rate from the GC 380 sufficiently to enable functional coupling to the DMS 386. As in the case of FIG. 1, the solid-state flow generator 372 includes an ion source 374, an ion attractor 376, and a constrained flow channel 378.

In operation, a sample fluid S is drawn into the inlet 390 of GC 380, whereupon it may be heated by the heater 388 to enhance separation of desired species from interferents within the sample S. After separation, a portion of the sample S passes into the GC-to-DMS channel 384. In a similar fashion to the illustrative embodiment of FIG. 1, the ion source 374 and the ion attractor 376 of the solid-state flow generator 372 interact to create a fluid flow 379 in the constrained channel 378. The fluid flow 379 combines with the sample flow 383 in the channel 384 to form a combined flow 385 having sufficient flow rate to satisfy the flow rate needs of the DMS 386.

Figure 10:
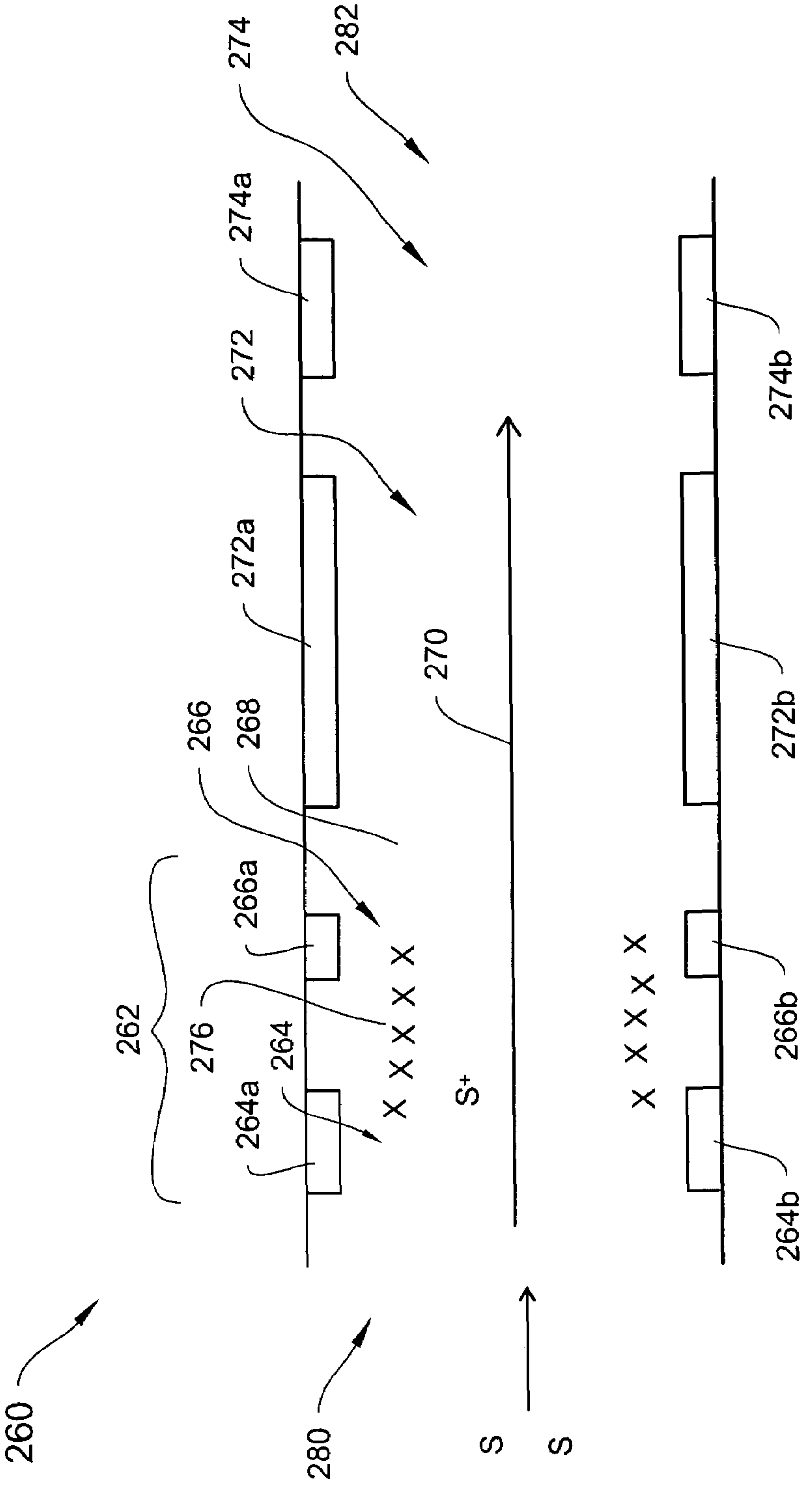
FIG. 10 is a conceptual block diagram of a FAIMS/DMS analyzer system incorporating a solid-state flow generator that shares an ion source with the analyzer according to an illustrative embodiment of the invention.

FIG. 10 is a conceptual block diagram of a FAIMS/DMS analyzer system 260 incorporating a solid-state flow generator 262 that shares an ion source 264 with the analyzer system 260 according to an illustrative embodiment of the invention. As in the case of the illustrative embodiment of FIG. 1, the solid-state flow generator 262 includes an ion source 264, an ion attractor 266, and a constrained flow channel 268. In this instance, the ion source 264 includes top **264*a* and bottom 264*b* electrodes and the ion attractor 266 includes top 266*a* and bottom 266*b* electrodes. As described above with respect to FIG. 1, the ion source 264 provides a source of ions and ion attractor 266 attracts either positive or negative ions, depending on an applied bias voltage. The ion flow created in the constrained channel 268 due to the ion flow generated by the interaction of the ion source 264 with the ion attractor 266 creates a fluid, e.g., a sample gas flow. In addition to providing a propulsive force for the sample gas in the direction 270, the ion source 264 also ionizes the sample gas for FAIMS/DMS analysis. In a similar fashion to the illustrative embodiment of FIG. 8, the filter 272 includes electrode plates 272*a* and 272*b* to provide filtering of the gas sample, while the detector 274 includes electrode plates 274*a* and 274*b*** to provide species detection.

In operation, a sample gas is drawn into the inlet 280 by a vacuum or pressure drop created at the inlet 280 due to the movement of ions between the ion source 264 and the ion attractor 266 in the constrained channel 268. While being transported in the direction 270 by the movement of the ions from the ion source 264 to the ion attractor 266, the sample gas is also ionized by the ion source 264 in preparation for detection by the detector 274. Depending on the polarity of the biased electrodes **266*a* and 266*b*, either negative or positive sample ions 276 are drawn down the flow path 270, while the other ions are repelled by the attractor electrodes 266*a* and 266*b*. In some illustrative embodiments where the flow path is curved, as in a cylindrical DMS flow path, the ions that pass the electrodes 266*a* and 266*b* focus toward the center of the flow path 270. As described with regard to the illustrative embodiment in FIG. 8, the filter 272 filters the gas sample while the detector 274** provides species detection. After detection, the sample gas may be expelled through the outlet 282 to another analyzer, such as the analyzer 130 of FIG. 5, a sample collection filter, or the outside environment.

Figure 11:
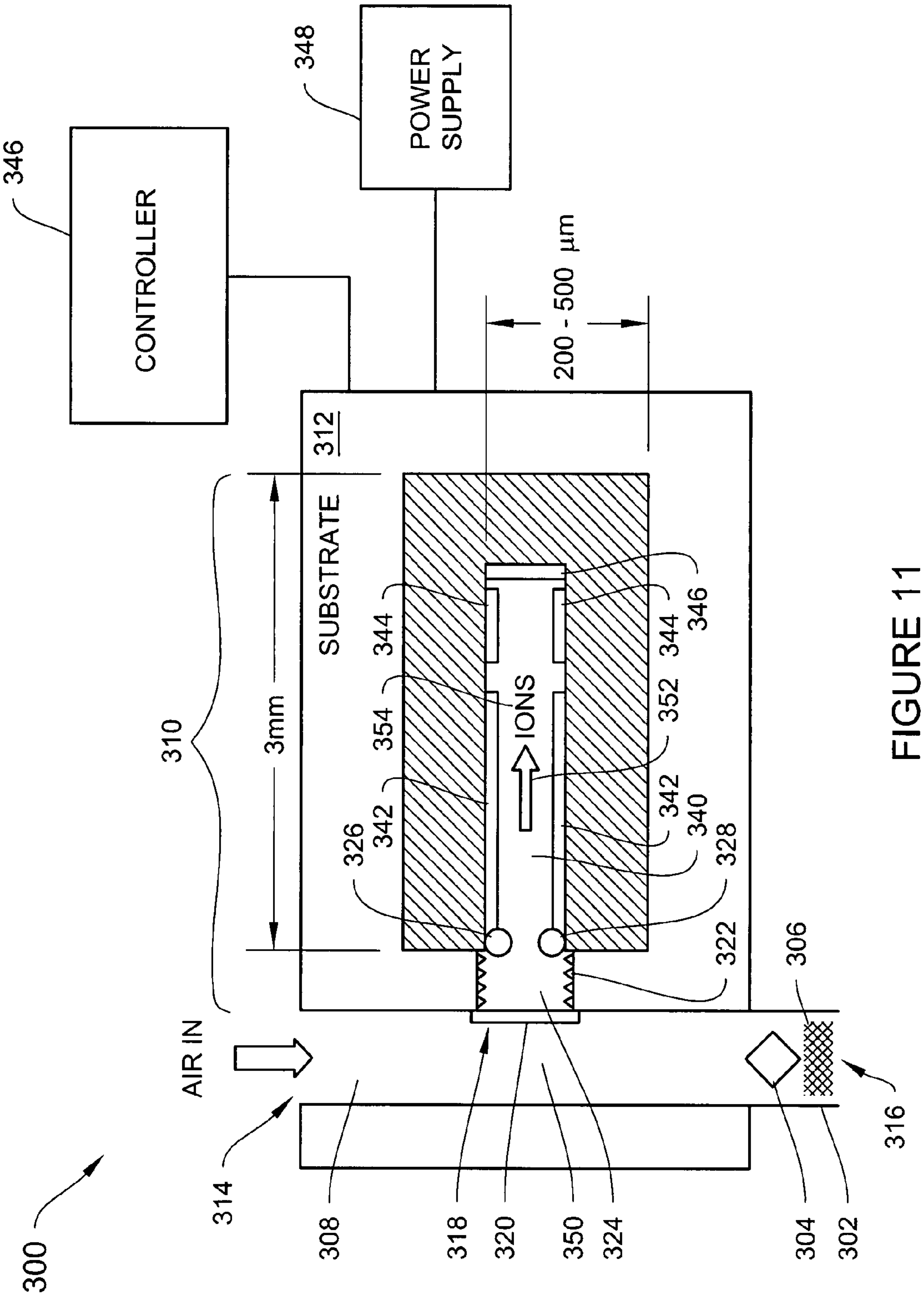
FIG. 11 is a conceptual block diagram of a compact DMS analyzer system employing a solid-state flow generator flow generator according to an illustrative embodiment of the invention.

FIG. 11 is a conceptual diagram of a compact DMS analyzer system 300 employing a solid-state flow generator 302 according to an illustrative embodiment of the invention. As in the case of the illustrative embodiment of FIG. 1, the solid-state flow generator 302 includes an ion source 304, an ion attractor 306, and a constrained flow channel 308. As described above with respect to FIG. 1, the ion source 304 provides a source of ions and the ion attractor 306 attracts either positive or negative ions, depending on an applied bias voltage. The ion flow created in the constrained channel 308 due to the ion flow generated by the interaction of the ion source 304 with the ion attractor 306 creates a fluid, e.g., a sample gas, flow. In some illustrative embodiments, the DMS analyzer system 300 may be miniaturized such that its analyzer unit 310 is included in an application-specific integrated circuits (ASICs) embedded on a substrate 312.

As in the case of the illustrative embodiment of FIG. 5, the constrained channel 308 includes an inlet end 314 and an outlet end 316. The constrained channel 308 also includes a sample introduction inlet 318 to enable the analyzer 310 to collect the sample gas for analysis. A pre-concentrator 320 may be employed at the sample introduction inlet 318 to concentrate the sample and improve analysis accuracy. An ionizer 322 provides ionization of the sample using either a radioactive $Ni^{63}$ foil or a non-radioactive plasma ionizer within ionization region 324. A plasma ionizer has the advantage of enabling precise control of the energy imparted to the sample gas for ionization. Ideally, only enough energy to ionize the sample gas, without producing nitric oxides (NOx's) and ozone, is imparted. NOx's and ozone are undesirable because they can form ion species that interfere with the ionization of CWA agents. Because diffusion and mobility constants generally depend on pressure and temperature, the DMS analyzer system 300 may include a temperature sensor 326 and/or a pressure sensor 328 for regulating the temperature and/or pressure of the sample gas within the analyzer unit 310 for more accurate analysis. The analyzer 310 also includes an analytical region 340 with filter plates 342 and detector plates 344. A molecular sieve 346 may be employed to trap spent analytes.

As in the case of the illustrative embodiments of FIG. 8, the controller 346 provides control of filtering and detection while also providing an output of the detection results. The power supply 348 provides power to the filter plates 342, solid-state flow generator 302, and any other component requiring electrical power.

The controller electronics 346 for the DC compensation voltage, the ion heater pumping, the DMS ion motion, and the pre-concentrator 320 heater may be located with the analyzer unit 310. Also, the detector 344 electronics, pressure 326 and temperature 328 sensors, and the processing algorithm for a digital processor may reside within analyzer 310.

At atmospheric pressure, to realize the benefits of mobility nonlinearity, the DMS analyzer system 300 illustratively employs RF electric fields of about $10^6$ V/m, and about 200 V at about a $200\times10^{-6}$ μm gap. However, any suitable RF electric field parameters may be employed. The power supply 348 may be remotely located relative to the analyzer unit 310 to generate RF voltage for filter plates 342

The DMS analyzer system 300 may also interface with a personal computer (PC) or controller 346 to utilized signal-processing algorithms that convert analyzer 310 outputs into identification of analytes and concentration levels. The controller 346 or an interfacing PC may also facilitate control and power management for the DMS analyzer system 300. The supporting electronics for the DSM analyzer system 300 may be implemented, for example, on an ASIC, a discrete printed circuit board (PCB), or System on a Chip (SOC).

In operation, the solid-state flow generator/transport pump 302 draws samples into the DMS analyzer system 300 at the inlet 314 and past a CWA-selective chemical membrane concentrator 320 having an integrated heater. The CWA-selective chemical membrane pre-concentrator 320 may also serve as a hydrophobic barrier between the analytical region 340 of the analyzer system 300 and the sample introduction region 350. The membrane of the pre-concentrator 320, illustratively, allows CWA agents to pass, but reduces the transmission of other interferrents and act as a barrier for moisture.

The pre-concentrator 320 may use selective membrane polymers to suppress or block common interferences (e.g., burning cardboard) while allowing CWA agents or CWA simulants to pass through its membrane. Although many selective membrane materials are available, even the simplest, poly-dimethyl siloxane (PDMS), may be a preferred membrane/concentrator/filter to reject water vapor and collect CWA analytes. At high concentration levels, water vapor molecules may cluster to the analytes, altering the analytes' mobilities. Membrane materials such as hydrophobic PDMS tend to reduce the vapor to acceptable levels while absorbing and releasing analyte atoms. The thin membrane of the pre-concentrator 320 may also be heated periodically to deliver concentrated analytes to the ionization region 324 and analytical region 340.

Except for diffusion of analytes through the membrane/filter/pre-concentrator 320, the analytical region 340 is generally sealed to the outside atmosphere. Thus, the analyzer system 300 may employ elements for equalizing the pressure inside analytical region 340 with the atmospheric pressure outside the analyzer system 300. Once the sample gas molecules are ionized, the ions are driven longitudinally in the direction indicated by the arrow 352 through the ion filter plates 342 by static or traveling electrostatic fields, as opposed to being driven by the carrier gas. The filter plates 342 apply transverse radio frequency (RF) and direct current (DC) excitation electric fields to the ions moving through analytical region 340 to separate the species within a sample.

With water vapor removed, interferrents (e.g., hydrocarbons and others) typically comprise roughly 0.10% of the incoming air volume by weight. Depending on the collection efficiency of the pre-concentrator 320, the molecular sieve 346 may be sized to support about 6, 9, 12 or more months of substantially continuous or continuous operation before saturating. The molecular sieve 346 may also be configured to allow movement of air in a circulatory fashion through the ion filter electrodes 342 and back to the ionization region 324.

The DMS analyzer system 300 may be used to detect low concentrations (e.g., parts per trillion (ppt)) of CWAs, such as, without limitation, nerve and blister agents. In one illustrative embodiment, the DMS analyzer system 300 includes a high-sensitivity, low-power, sample gas analyzer 304 that builds on MEMS technology, but further miniaturizes the DMS analyzer system 300 to achieve parts-per-trillion sensitivity, about 0.25 W overall power consumption (i.e., 1 Joule measurement every 4 seconds), and a size of about 2-$cm^3$ or less.

Because of the smaller analytical region 340 and the resulting lower flow rate requirements, a low-power (e.g., mW) solid-state gas transport pump 302, using ionic displacement, may be employed to draw an air sample into the DMS analyzer system 300 and onto the CWA-selective chemical membrane pre-concentrator 320. Compact DMS analyzer systems according to the invention have shown very high sensitivities to CWA simulants. By way of example, a compact DMS analyzer system according to the invention has been able to detect methyl salycilate at parts-per-trillion (ppt) levels. The DMS analyzer system 300 has the ability to resolve CWA simulants from interferrents that cannot be resolved by current field-deployed detection technologies.

Figure 12:
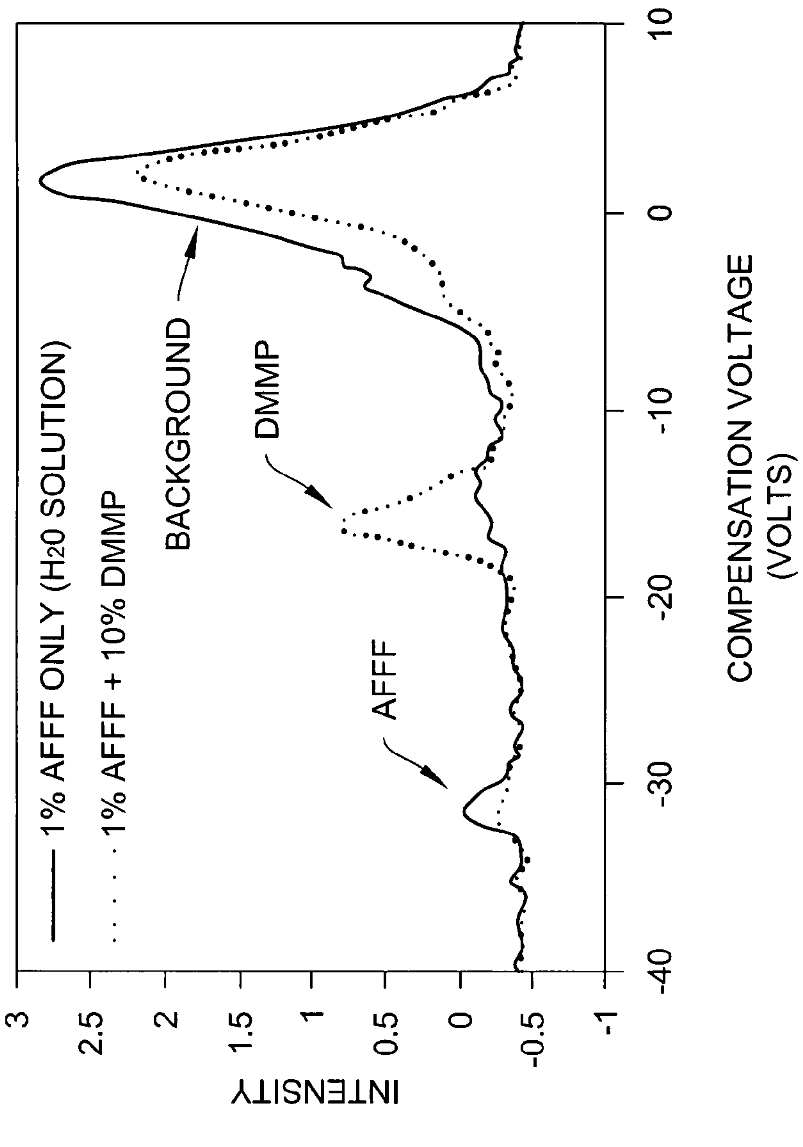
FIG. 12 is a graph depicting a DMS spectra showing resolution of dimethylmethylphosphonate (DMMP) from aqueous firefighting foam (AFFF) as measured in an analyzer system of the type depicted in FIG. 9 and employing a solid-state flow generator according to an illustrative embodiment of the invention.

FIG. 12 is a graph depicting a DMS spectra showing resolution of dimethylmethylphosphonate (DMMP) from aqueous firefighting foam (AFFF) as measured in a DMS analyzer system of the type depicted at 300 in FIG. 10 and employing a solid-state flow generator 302 according to an illustrative embodiment of the invention. FIG. 12 illustrates the ability of the DMS analysis system 300 to resolve CWA simulants from interferrents.

In one illustrative embodiment, a compact hand-held DMS analyzer system 300 is achieved by combining the following design characteristics: (a) using the analyzer/filter/detector 310 with improved sensitivity and size reduction; (b) using the solid-state flow generator of the invention as a gas transport pump 302 to sample and move analytes; (c) using the CWA-selective chemical membrane pre-concentrator 320 with integrated heater (in some configurations provided by using a solid-state generator of the invention to transfer heat from other analyzer system components to the pre-concentrator 320) to remove water vapor and to concentrate; and/or (d) using electric field propulsion of the ions 354 through the analytical region 340 of analyzer 310.

According to various illustrative embodiments, the invention improves the resolution of species identification over conventional systems, while decreasing size and power to achieve parts-per-trillion sensitivity, a less than about 0.25 mW overall power dissipation, and a size of about a 2-$cm^3$ or less in an entire system not including a power source or display, but including an RF field generator. According to some embodiments, an analyzer system of the invention has a total power dissipation of less than about 15 W, about 10 W, about 5 W, about 2.5 W, about 1 W, about 500 mW, about 100 mW, about 50 mW, about 10 mW, about 5 mW, about 2.5 mW, about 1 mW, and/or about 0.5 mW. According to further embodiments, an analyzer system, for example, employing a solid-state flow generator according to the invention, optionally including a display (e.g., indicator lights and/or an alphanumeric display) and a power source (e.g., a rechargeable battery) compartment, along with an RF field generator, may have a total package outer dimension of less than about 0.016 $m^3$, 0.0125 $m^3$, 0.01 $m^3$, 0.0056 $m^3$, 0.005 $m^3$, 0.002 $m^3$, 0.00175 $m^3$, 0.0015 $m^3$, 0.00125 $m^3$, 0.001 $m^3$, 750 $cm^3$, 625 $cm^3$, 500 $cm^3$, 250 $cm^3$, 100 $cm^3$, 50 $cm^3$, 25 $cm^3$, 10 $cm^3$, 5 cm3, 2.5 $cm^3$, with the package being made, for example, from a high impact plastic, a carbon fiber, or a metal. According to further embodiments, an analyzer system, for example, employing a solid-state flow generator according to the invention, including an RF generator, and optionally including a display, keypad, and power source compartment, may have a total package weight of about 5 lbs, 3 lbs, 1.75 lbs, 1 lbs, or 0.5 lbs.

Table 1 provides a comparison of drift tube (e.g., the constrained channel) dimensions, fundamental carrier gas velocities, and ion velocities for a various illustrative embodiments of a DMS analyzer system 300 depending on the flow rate (Q) available to the analysis unit. Designs 1-4 provide flow rates of varying orders of magnitude ranging from about 0.03 l/m to about 3.0 l/m. Table 1 illustrates that as the flow rate is decreased through the DMS analyzer system 300, the filter plate dimensions and power requirements are reduced. Table 1 is applicable to a DMS analyzer system 300 using either a sample gas or longitudinal field-induced ion motion. The time to remove an unwanted analyte is preferably less than about the time for the carrier to flow through the filter region (tratio). Also, for a particular target agent, the lateral diffusion as the ion flows through the analyzer 310 is preferably less than about half the plate spacing (difratio). Based on this criteria, the plate dimensions may be reduced to about 3×1 $mm^2$ or smaller, while the ideal flow power may be reduced to less than about 0.1 mW. Thus, even for design 4, the number of analyte ions striking the detectors is sufficient to satisfy a parts-per-trillion detection requirement.

TABLE 1

Illustrative DMS Analyzer System Design Specifications and Characteristics

| Description | Units | Symbol | Design 1 Q = 3 l/m Baseline | Design 2 Q = 0.3 l/m Base dimen | Design 3 Q = 0.3 l/m scaled | Design 4 Q = 0.03 l/m |
|---|---|---|---|---|---|---|
| plate dimensions | | | | | | |
| *length | m | L | 0.025 | 0.025 | 0.005 | 0.001 |
| *width | m | b | 0.002 | 0.002 | 0.001 | 0.0004 |
| *air gap | m | h | 0.0005 | 0.0005 | 0.0005 | 0.0002 |
| *volume flow rate | l/min | Qf | 3 | 0.3 | 0.3 | 0.03 |
| Flow velocity | m/s | Vf | 50 | 5 | 10 | 6.25 |
| pressure drop | Pa | dPf | 1080 | 108 | 43.2 | 33.75 |
| flow power | W | Powf | 0.054 | 0.00054 | 2.16E−04 | 1.69E.05 |
| RF excitation | V | Vrf | 650 | 650 | 650 | 260 |
| design ratios | | | | | | |
| Time to remove unwanted analyte divided by carrier time | s | tratio | 0.0128 | 0.0013 | 0.0128 | 0.0160 |
| wanted ions-lateral diffusion divided by half gap | s | difratio | 0.200 | 0.632 | 0.200 | 0.283 |
| ions to count per cycle | — | Nout | 1.22E+07 | 1.22E+06 | 1.22E+06 | 1.22E+05 |

For sample/carrier gases, there does not appear to be an electromechanical pump that operates at the preferred flow characteristics with an efficiency better than about 0.5%. With a 0.5% efficiency, an ideal flow loss of about 0.05 mW results in an actual power consumption of about 10 mW, about a factor of 100 greater than in the above discussed illustrative embodiment of the invention.

As evidenced by the foregoing discussion and illustrations, solid-flow generators of the invention are useful in a wide range of systems and applications. It should be noted that the invention may be described with various terms, which are considered to be equivalent, such as gas flow generator, ion transport gas pump, solid-state gas pump, solid-state flow generator, solid-state flow pump or the like. The illustrative solid-state flow generator may be provided as a stand-alone device or may be incorporated into a larger system.

In certain embodiments, aspects of the illustrative compact DMS system of FIG. 10 and illustrated in various other figures may employ features and/or be incorporated into systems described in further detail in U.S. Pat. Nos. 6,495,823 and 6,512,224, the entire contents of both of which are incorporated herein by reference.

What is claimed is:

1. A sample analyzer comprising:
- an inlet for receiving an effluent including a sample,
- a solid state flow generator including:
  - a first ion source, and
  - an ion attractor in fluid communication with the ion source for attracting ions from the ion source to generate a flow of the effluent through a flow path, and
- an ion mobility based analyzer along the flow path including:
  - an ion mobility based filter for passing selected sample ions through a time-varying field, and
- a detector for detecting the ions exiting the ion mobility based filter.

2. The analyzer of claim 1, wherein the solid state flow generator feeds the effluent to the ion mobility based filter.

3. The analyzer of claim 1, wherein the solid state flow generator draws the effluent to the ion mobility based filter.

4. The analyzer of claim 1, wherein the flow path has first and second ends, the first ion source being located outside of the flow path proximal to the first end, the flow path being between the first ion source and the second end to cause the effluent flow to be in a direction from the first end toward the second end.

5. The analyzer of claim 1, wherein the flow path has a plurality of axially extending sides.

6. The analyzer of claim 5, wherein at least one of the axially extending sides is open along at least a portion of it's length.

7. The analyzer of claim 1, wherein the flow path has an ovular cross-sectional shape.

8. The analyzer of claim 1, wherein the flow path has an opening extending along at least a portion of it's length.

9. The analyzer of claim 1, wherein at least one side of a portion of the flow path is defined by a component on an integrated circuit board.

10. The analyzer of claim 1, wherein at least one side of a portion of the flow path is defined by a substrate.

11. The analyzer of claim 1 including a second inlet located along a length of the flow path for allowing a fluid to be introduced into the flow path for mixing with the effluent flow.

12. The analyzer of claim 11, wherein the fluid includes a dopant.

13. The analyzer of claim 11, wherein the time-varying field includes an asymmetric field.

14. The analyzer of claim 1 including a second ion source for generating sample ions.

15. The analyzer of claim 1, wherein the ion mobility based filter includes at least one of a DMS and IMS.

16. The analyzer of claim 1, wherein the detector includes at least one of a detector electrode, MS, and TOFMS.

17. The analyzer of claim 1 comprising a gas chromatograph in communication with the sample inlet or along the flow path.

18. The analyzer claim 1, wherein the analyzer is of a hand-held size or smaller.

* * * * *